(12) United States Patent
Ruthemeier et al.

(10) Patent No.: US 10,343,837 B2
(45) Date of Patent: Jul. 9, 2019

(54) METHOD AND APPARATUS FOR PRODUCING PACKS FOR CIGARETTES, AND PACK FOR CIGARETTES

(71) Applicant: Focke & Co. (GmbH & Co. KG), Verden (DE)

(72) Inventors: Sven Ruthemeier, Kirchlinteln (DE); Sebastian Stiller, Verden (DE); Corvyn Sommer, Verden (DE)

(73) Assignee: Focke & Co. (GmbH & Co. KG), Verden (DE)

( * ) Notice: Subject to any disclaimer, the term of this patent is extended or adjusted under 35 U.S.C. 154(b) by 56 days.

(21) Appl. No.: 15/317,266

(22) PCT Filed: Mar. 25, 2015

(86) PCT No.: PCT/EP2015/000633
§ 371 (c)(1),
(2) Date: Dec. 8, 2016

(87) PCT Pub. No.: WO2015/192925
PCT Pub. Date: Dec. 23, 2015

(65) Prior Publication Data
US 2017/0107047 A1    Apr. 20, 2017

(30) Foreign Application Priority Data

Jun. 16, 2014  (DE) .................. 10 2014 108 423
Nov. 17, 2014  (DE) .................. 10 2014 116 784

(51) Int. Cl.
*B65D 85/10*    (2006.01)
*B65B 19/10*    (2006.01)
(Continued)

(52) U.S. Cl.
CPC .......... *B65D 85/1081* (2013.01); *A24F 15/00* (2013.01); *B65B 19/025* (2013.01);
(Continued)

(58) Field of Classification Search
CPC . B65D 85/1081; B65D 85/1045; A24F 15/00; B65G 47/52; B65B 19/04;
(Continued)

(56) References Cited

U.S. PATENT DOCUMENTS 1,253,219 A * 1/1918 Dula .................. B65D 85/1072
                                                          206/256
2,185,605 A * 1/1940 Murphy .................. B65D 75/54
                                                          206/252
(Continued)

FOREIGN PATENT DOCUMENTS

DE    7629556 U1    4/1977
DE    60013499 T2    10/2005
(Continued)

OTHER PUBLICATIONS

European Patent Office, Search in connection with related application EP 15713379.4, dated Dec. 6, 2017.
(Continued)

*Primary Examiner* — Chun Hoi Cheung
(74) *Attorney, Agent, or Firm* — Laurence P. Colton; Smith Tempel Blaha LLC

(57) ABSTRACT

A method for producing packs for cigarettes, in which at least one group of cigarettes is wrapped in an inner wrapper and is introduced into a pocket of a folding turret and therein is packed in a blank for the pack, and a corresponding apparatus and to a pack for cigarettes. At least one dimension of the at least one cigarette group does not correspond to the respective dimension of the interior space of the pack, the at least one deviating dimension is equalized by at least one filler piece, and the at least one filler piece is wrapped in the inner wrapper conjointly with at least one cigarette group.

9 Claims, 15 Drawing Sheets

(51) Int. Cl.
*B65B 19/22* (2006.01)
*B65B 61/20* (2006.01)
*B65G 47/52* (2006.01)
*A24F 15/00* (2006.01)
*B65B 19/02* (2006.01)
*B65B 19/04* (2006.01)
*B65B 19/20* (2006.01)

(52) U.S. Cl.
CPC .............. *B65B 19/04* (2013.01); *B65B 19/10* (2013.01); *B65B 19/20* (2013.01); *B65B 19/223* (2013.01); *B65B 61/20* (2013.01); *B65D 85/1045* (2013.01); *B65G 47/52* (2013.01); *B65G 2201/0226* (2013.01)

(58) Field of Classification Search
CPC ....... B65B 19/10; B65B 19/20; B65B 19/223; B65B 61/20
USPC .................................................. 206/242–276
See application file for complete search history.

(56) References Cited

U.S. PATENT DOCUMENTS

| | | | | |
|---|---|---|---|---|
| 2,331,035 A | * | 10/1943 | Lundstrom | B65D 75/54 206/252 |
| 2,688,434 A | * | 9/1954 | Udel | B65D 85/1009 206/264 |
| 2,783,929 A | * | 3/1957 | Delaney | B65D 5/5021 206/273 |
| 3,007,623 A | * | 11/1961 | Clemens | B65D 5/48 229/120.03 |
| 3,159,272 A | * | 12/1964 | Swift | B65D 77/042 131/256 |
| 3,489,272 A | * | 1/1970 | Rosen | B65D 5/5088 206/256 |
| 3,721,335 A | * | 3/1973 | Grant | B65D 5/4803 206/256 |
| 4,793,478 A | * | 12/1988 | Tudor | A24F 15/20 206/256 |
| 5,058,739 A | * | 10/1991 | Sainsbury | A24F 15/00 206/252 |
| 5,433,318 A | * | 7/1995 | Focke | B65D 85/1009 206/256 |
| 5,558,216 A | * | 9/1996 | Focke | B65D 5/5038 206/256 |
| 6,450,326 B1 | | 9/2002 | Hoffmann et al. | |
| 6,450,329 B1 | * | 9/2002 | Draghetti | B31F 1/247 206/252 |
| 6,726,006 B1 | * | 4/2004 | Funderburk | B65B 19/20 206/256 |
| 7,383,950 B1 | * | 6/2008 | Roberts | B65D 85/1045 206/256 |
| 7,954,635 B2 | * | 6/2011 | Biondi | B65D 5/4204 206/252 |
| 8,162,136 B2 | * | 4/2012 | McKenzie | A24F 23/04 206/236 |
| 8,763,800 B2 | * | 7/2014 | Agirbas | B65D 5/5023 206/256 |
| 2007/0130888 A1 | | 6/2007 | Osti | |

FOREIGN PATENT DOCUMENTS

| | | |
|---|---|---|
| DE | 102012017133 A1 | 3/2014 |
| EP | 2008935 A1 | 12/2008 |
| EP | 2008935 B2 | 12/2008 |
| EP | 2703304 A1 | 3/2014 |
| EP | 2986540 A1 | 2/2016 |
| GB | 588741 A | 6/1947 |
| RU | 2496694 C2 | 10/2013 |
| RU | 2627198 C2 | 1/2014 |
| WO | 2014170829 A1 | 10/2014 |

OTHER PUBLICATIONS

Deutsches Patent-Und Markenamt (German Patent and Trademark Office), Recherchenbericht (search on priority application), Feb. 11, 2015.

Russian Patent Office, Search in a related application, Aug. 27, 2018.

* cited by examiner

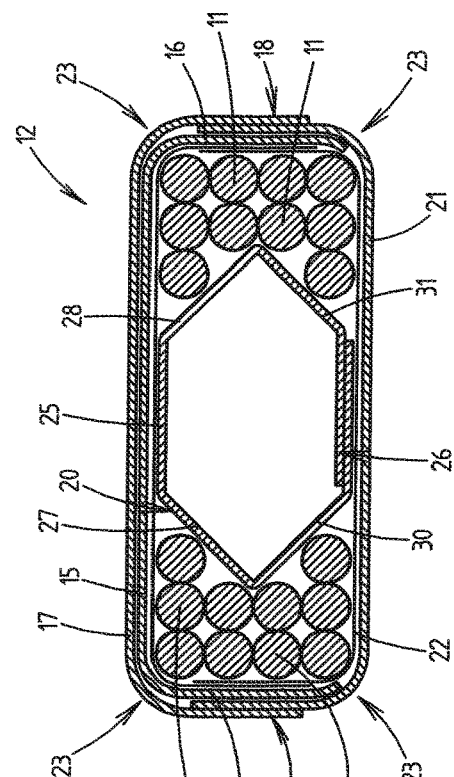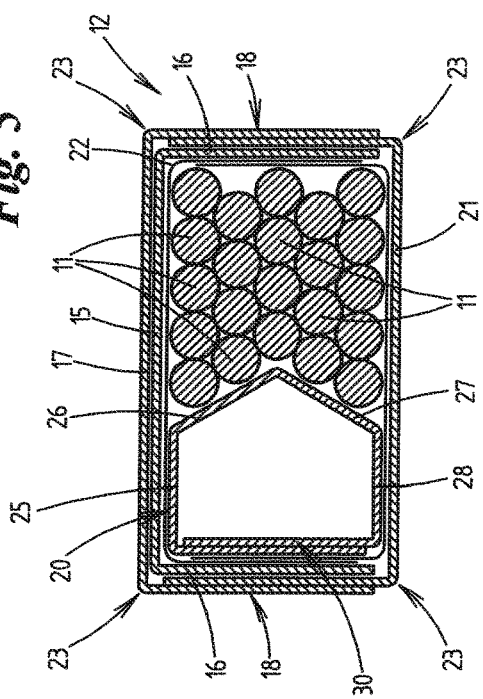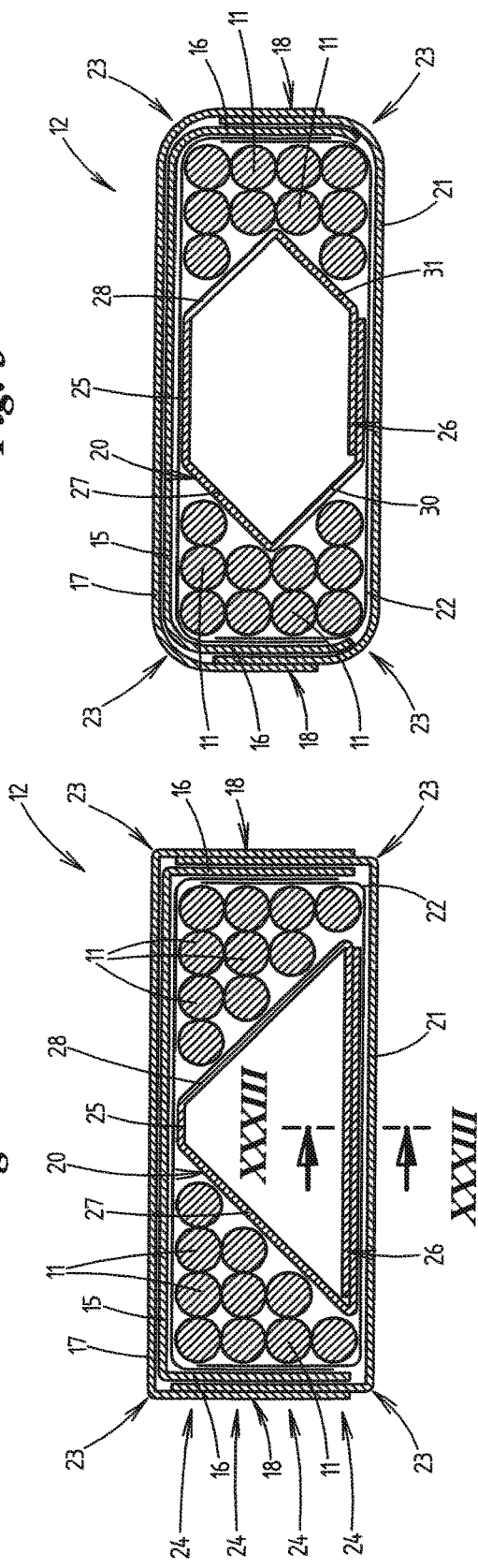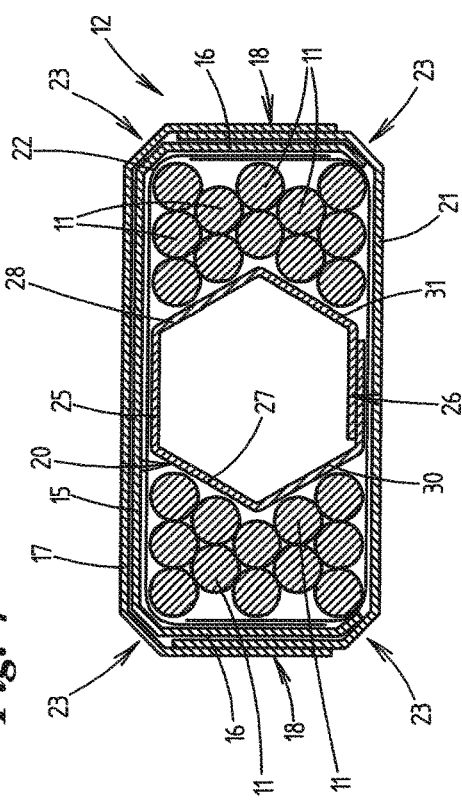

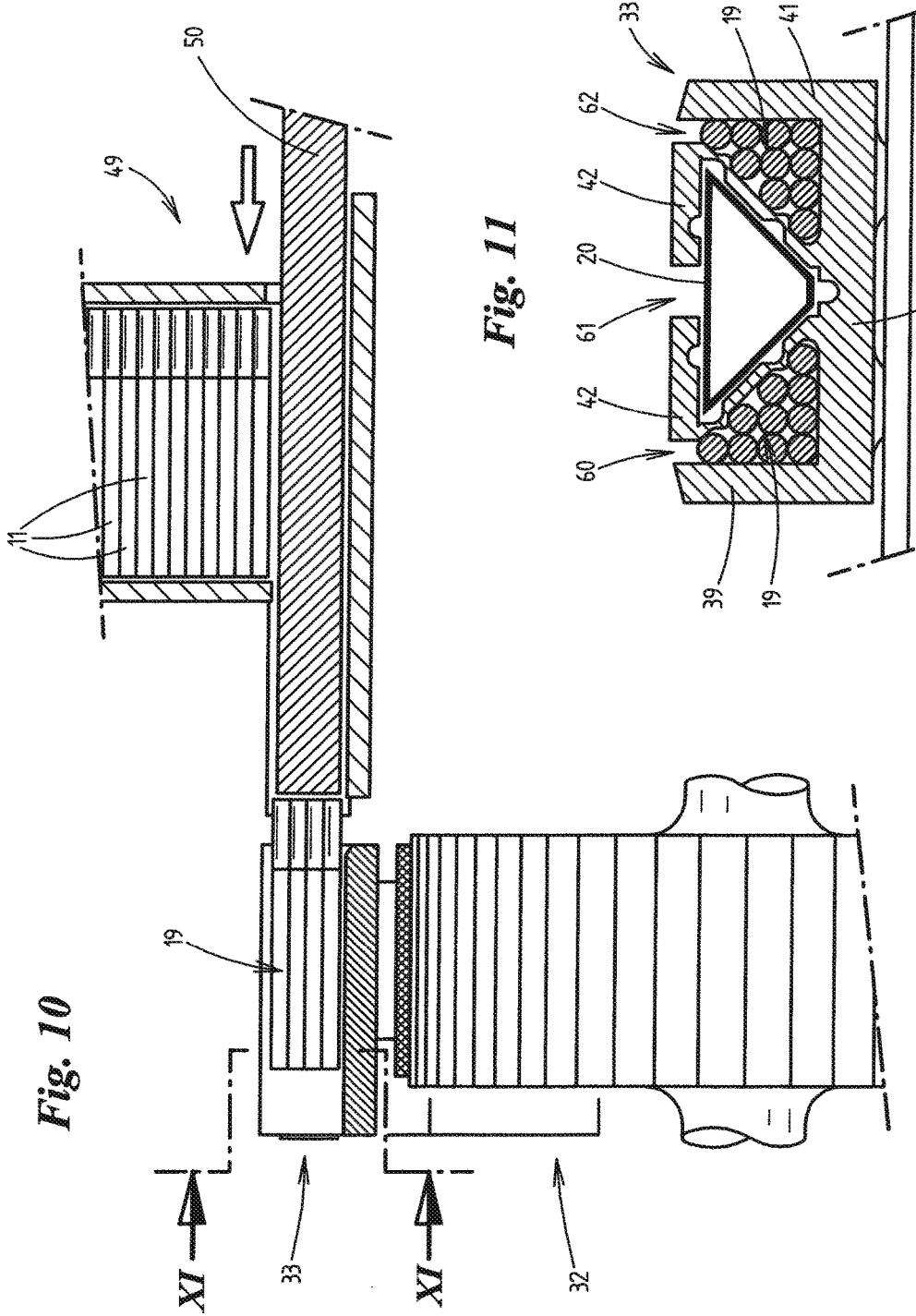

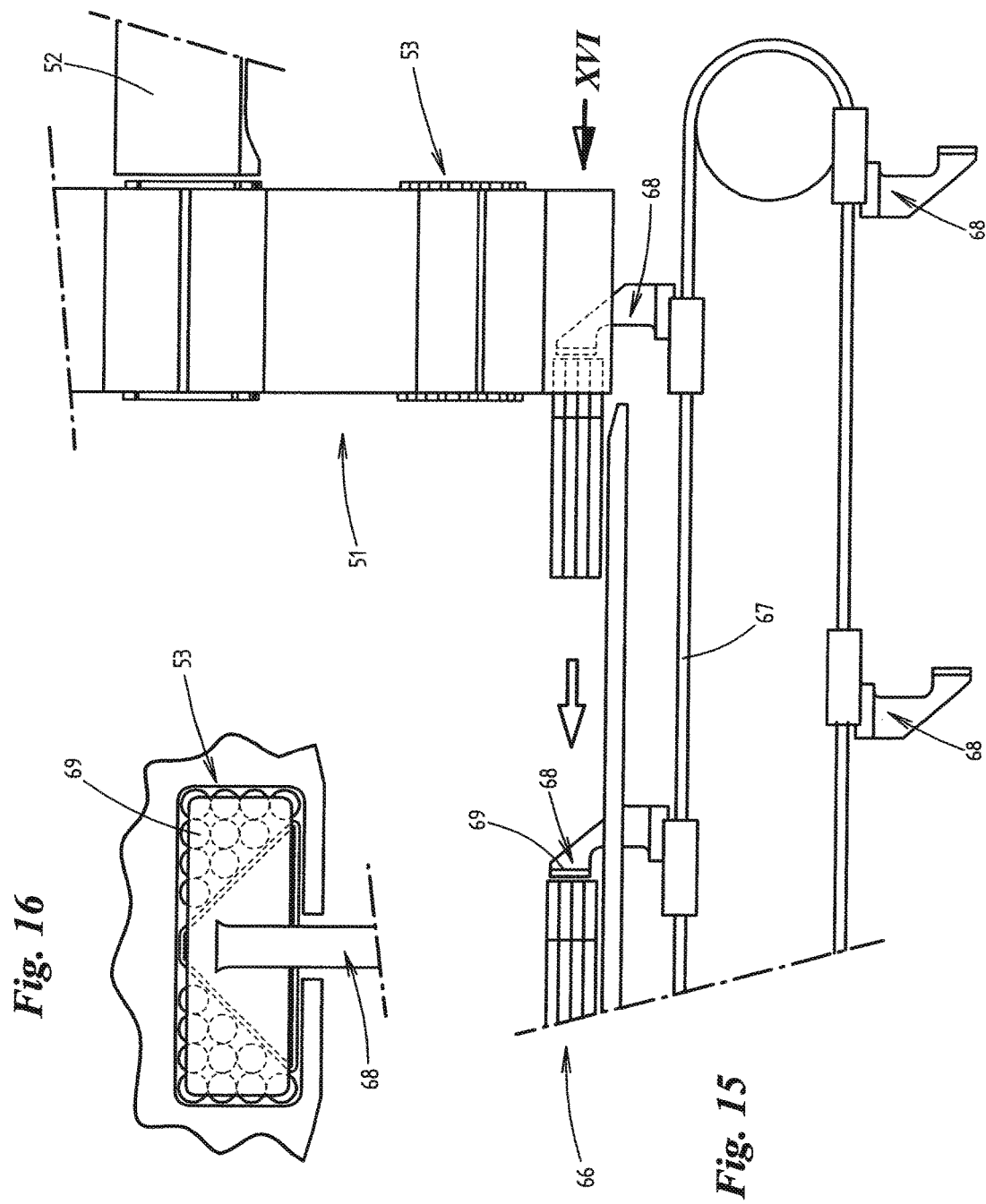

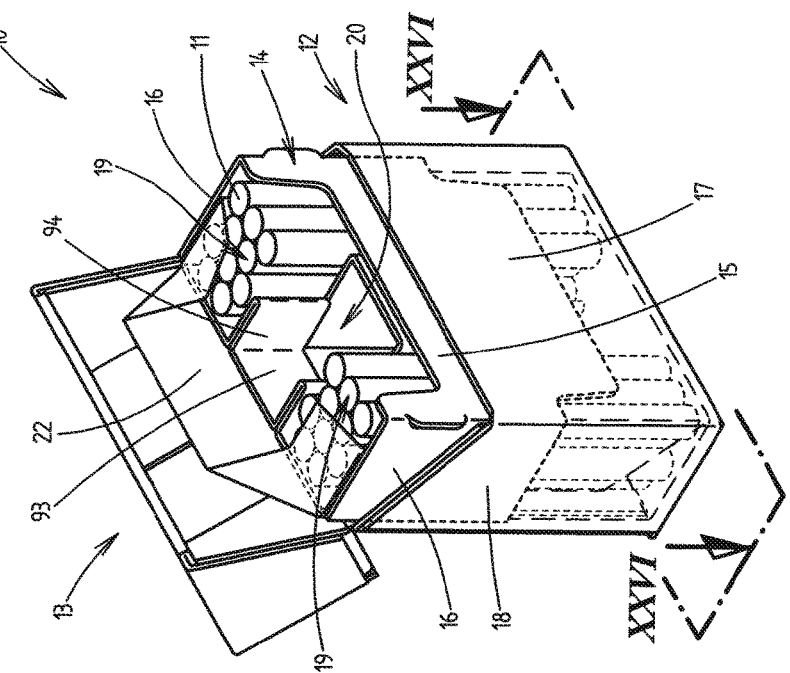
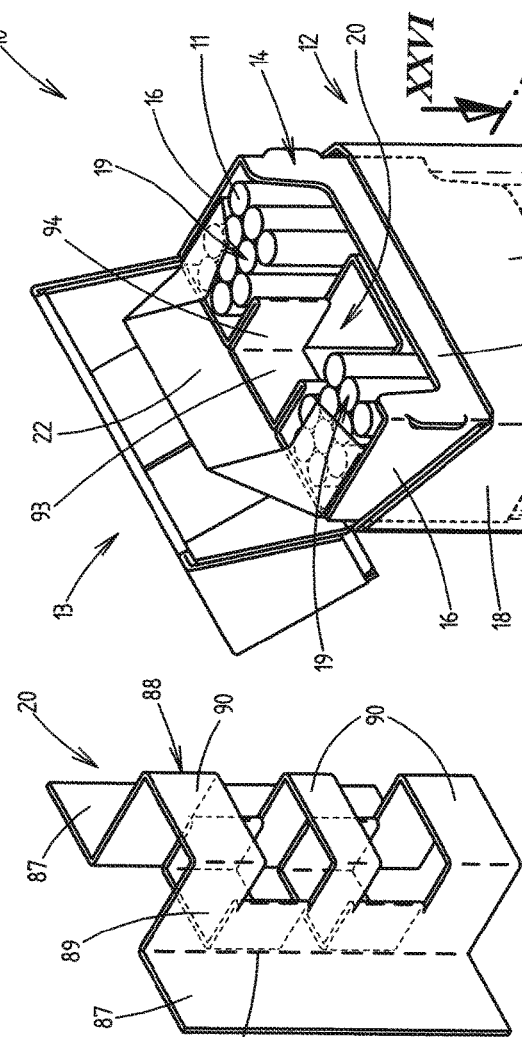
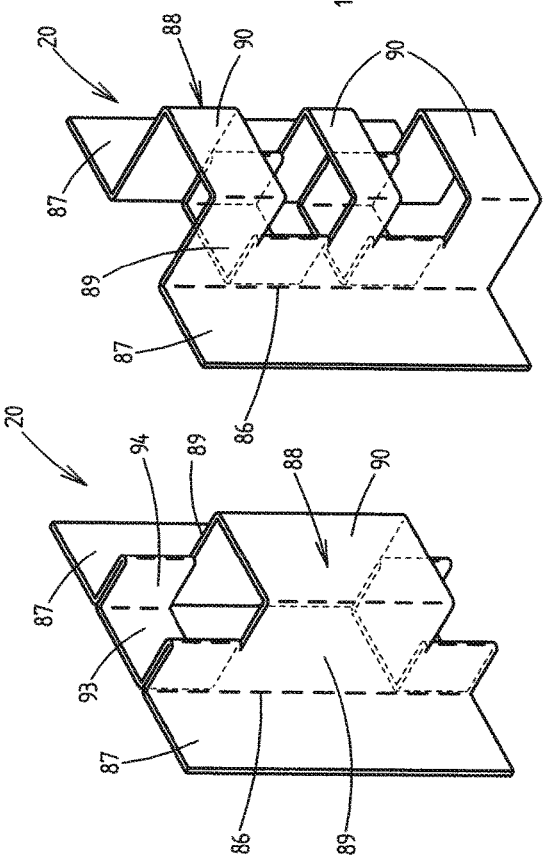
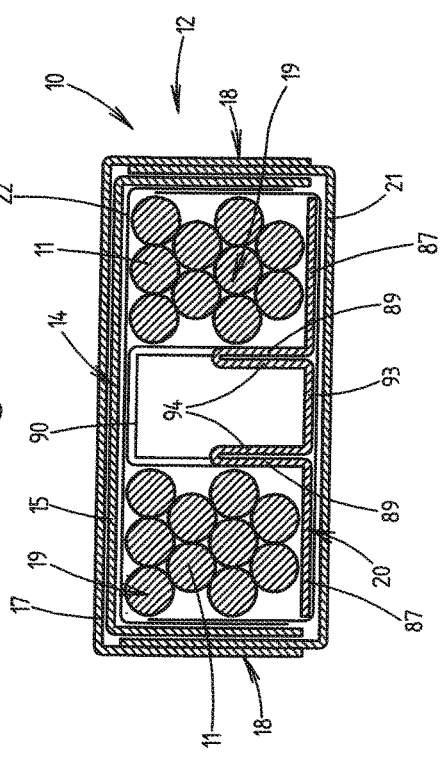

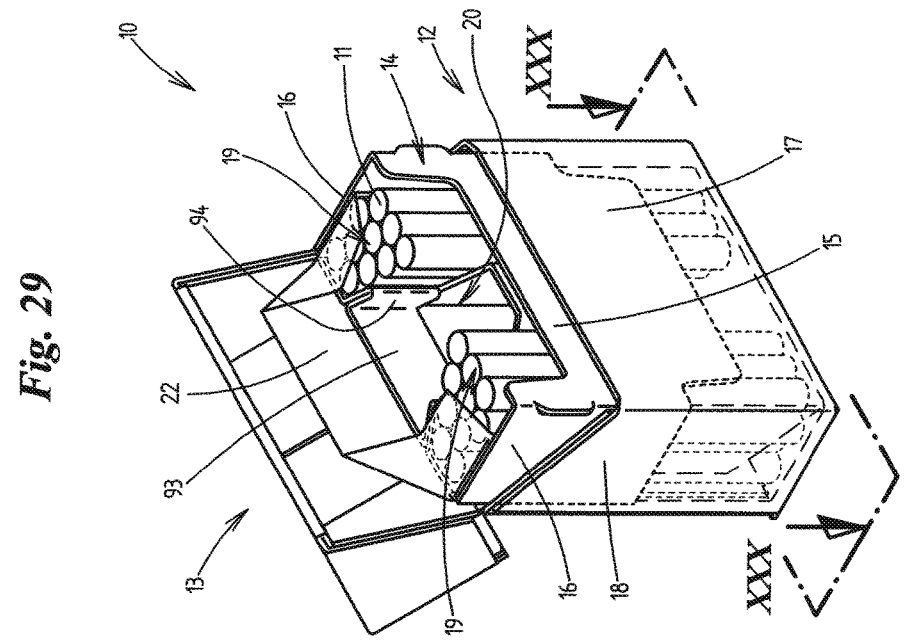
Fig. 29
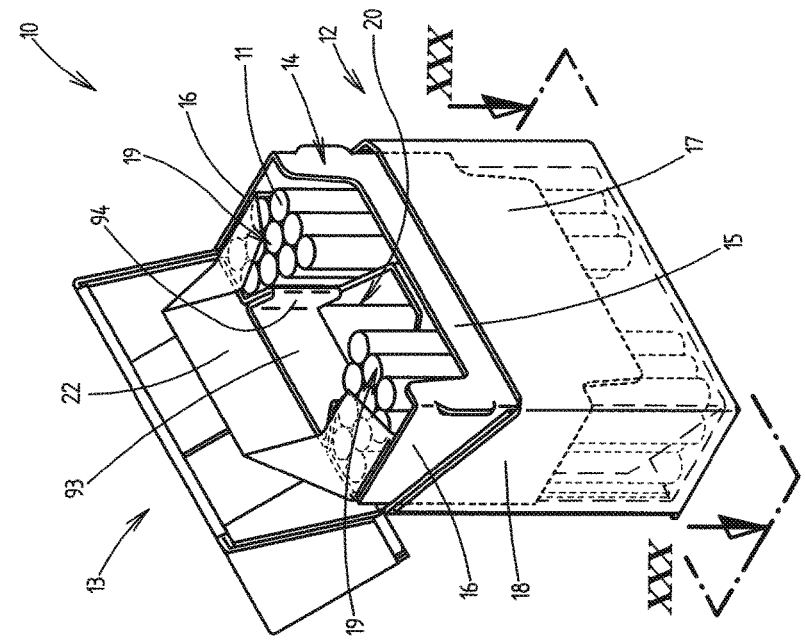
Fig. 28
Fig. 27
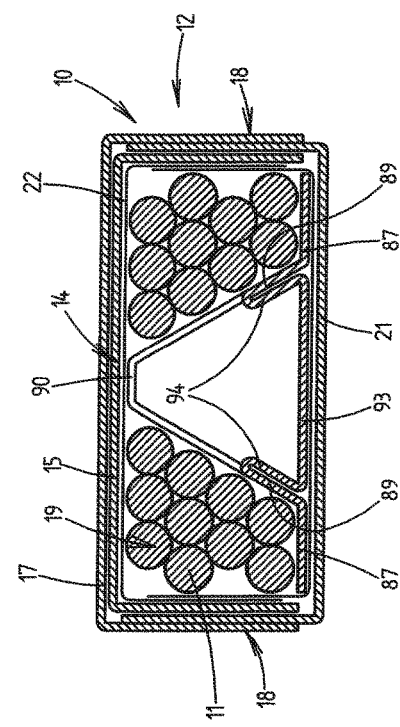
Fig. 30

METHOD AND APPARATUS FOR PRODUCING PACKS FOR CIGARETTES, AND PACK FOR CIGARETTES

STATEMENT OF RELATED APPLICATIONS

The application is the US National Phase of International Application No. PCT/EP2015/000633 having an International Filing Date of 25 Mar. 2015, which claims priority on German Patent Application No. 10 2014 108 423.3 having a filing date of 16 Jun. 2014 and German Patent Application No. 10 2014 116 784.8 having a filing date of 17 Nov. 2014.

BACKGROUND OF THE INVENTION

Technical Field

The invention relates to a method for producing packs for cigarettes, wherein at least one group of cigarettes is wrapped in an inner wrapper and is introduced into a pocket of a folding turret and therein is packed in a blank for the pack. Furthermore, the invention relates to a respective apparatus for producing packs for cigarettes, wherein at least one group of cigarettes is capable of being wrapped in an inner wrapper and is introducible into a pocket of a folding turret and there is capable of being packed in a blank for the pack. Furthermore, the invention relates to a respective pack for cigarettes, wherein at least one group of cigarettes is disposed as the pack content in the pack.

Prior Art

The freedom of design in terms of the construction or of the design of packs for cigarettes, respectively, may be severely limited in individual countries by virtue of legal requirements, or such a limitation is to be expected in the foreseeable future. In particular, it has to be assumed that packs for cigarettes may be allowed to have only specific dimensions such that adapting the dimensions of the pack to the respective dimensions of the pack content becomes difficult or even impossible.

BRIEF SUMMARY OF THE INVENTION

Proceeding therefrom, the invention is based on the object of proposing a method and an apparatus for producing packs for cigarettes that offer a solution that is as simple as possible in order for pack contents having dissimilar dimensions to be able to be packed in a simple manner. A respective pack is furthermore to be proposed.

In order for this object to be achieved, a method according to the invention has the features that at least one dimension of the at least one cigarette group does not correspond to the respective dimension of the interior space of the pack, and that the at least one deviating dimension is equalized by at least one filler piece, wherein the at least one filler piece is wrapped in the inner wrapper conjointly with at least one cigarette group.

It has been demonstrated that the employment of a filler piece represents a simple possibility for establishing an equalization between the dimensions of the pack and the dimensions of the cigarette group. Disposing the filler piece within the inner wrapper has moreover been established as being readily implementable in practice.

In the context of the invention, filler pieces that dispose of a polygonal cross section and have at least four longitudinal edges are preferably employed.

According to one preferred refinement of the invention it may be provided that the at least one cigarette group and the at least one filler piece are pushed into respective receptacles of a conveyor, in particular into separate receptacles of a pocket of a pocket-chain conveyor, and that the at least one cigarette group and the at least one filler piece in the longitudinal direction of the latter two are conjointly transferred into a common receptacle of an adjoining conveyor, in particular a transfer turret, and are transferred by the conveyor in the direction of an installation for wrapping the pack content in the inner wrapper.

One preferred embodiment of the invention provides that the or each filler piece and the or each cigarette group are separately and/or sequentially pushed into a separate receptacle of a pocket of a pocket-chain conveyor, and that the contents of the pocket as the pack content, in the longitudinal direction of the former, are conjointly shunted to an adjoining transfer turret, wherein the transfer turret has a common pocket for the or each filler piece and for the or each cigarette group.

In particular, it may be provided that the filler pieces are infed in multiple tracks, in particular by means of one or a plurality of transfer turrets for filler pieces, and that a plurality of filler pieces are simultaneously pushed into receptacles of adjacent pockets of the pocket-chain turret, and that a plurality of groups of cigarettes are simultaneously pushed into respective receptacles of the same pocket, in particular from a cigarette magazine.

A further particularity may lie in that the or each filler piece is formed in a sleeve-type manner from a blank of packaging material, and wherein mutually overlapping folding flaps of the blank in the region of at least one wall of the blank are interconnected, in particular by adhesive bonding, and wherein the sleeve and the or each cigarette group are converged and disposed in the pack in such a manner that the overlapping folding flaps of the blank of the sleeve are disposed in the region of a rear side of the pack.

It may be provided in particular that the folding flaps in the region of a lateral face of the filler piece that faces the rear side of the pack overlap in a fully planar manner or are disposed in a double layer, respectively.

In one preferred embodiment of the invention it may be provided that a filler piece and a plurality of groups of cigarettes are pushed into a pocket of the conveyor, forming the pack content.

An apparatus according to the invention has the features at least one dimension of the at least one cigarette group does not correspond to the respective dimension of the interior space of the pack, and that the at least one deviating dimension is equalized by at least one filler piece, wherein the filler piece is wrapped in the inner wrapper conjointly with at least one cigarette group.

According to one preferred refinement of the invention it may be provided that the or each filler piece and the or each group of cigarettes are capable of being pushed into a pocket of a conveyor, wherein the pocket has a plurality of receptacles each for one filler piece or one group of cigarettes, and that the content of the pocket, that is to say a formation from the or each filler piece and the or each group of cigarettes is capable of being conjointly or simultaneously, respectively, ejected out of the pocket by a common slide.

A particularity may lie in that the receptacles of the pocket are mutually delimited by walls of the pocket, and that the slide has a number of slide elements that corresponds to the number of receptacles, the bearing faces of said slide elements each being substantially adapted to and/or corresponding to the cross section of the receptacles or to the cross section of the respective filler pieces or groups of cigarettes, respectively, wherein in particular continuous and groove-type depressions that run in the ejection direction are molded in at least one wall of at least one receptacle, portions of the slide or of the respective slide elements, respectively, entering each of said depressions, and the latter, transversely to the ejection direction, protruding laterally beyond the cross section of the content of the respective receptacle, in particular of a filler piece.

In particular, it may be provided that the slide elements outside the pocket are connected by means of connection elements so as to form a slide, and that walls of the pocket have continuous slot-type clearances that run in the ejection direction, one connection element passing through each of said clearances, and that the width of the clearances is dimensioned such that individual cigarettes cannot drop out of the receptacles.

A further particularity may lie in that the filler pieces and the groups of cigarettes are infed to the conveyor in multiple tracks such that in each case a plurality of filler pieces and of cigarette groups are simultaneously transferable to the conveyor, and that a plurality of pack contents are simultaneously transferable from the conveyor to an adjoining conveyor, in particular a transfer turret, and that the pack contents are capable of being individually ejected from the conveyor, wherein the filler pieces, the cigarette groups, and the pack contents each are infed in the longitudinal direction to the conveyors, and/or are transferable between the conveyors, and/or are capable of being ejected from the conveyor.

A pack for cigarettes according to the invention has the features of that at least one dimension of the at least one cigarette group does not correspond to the respective dimension of the interior space of the pack, and that the at least one deviating dimension is equalized by at least one filler piece, wherein the filler piece is wrapped in the inner wrapper conjointly with at least one cigarette group.

According to one preferred refinement of the pack it may be provided that a collar is disposed in the pack, and that the filler piece is at least partially obscured by the collar, in particular in such a manner that a wall of the filler piece that points toward a box front wall is obscured by the collar, wherein for facilitating the retrieval of cigarettes from the pack preferably one clearance in a collar front wall does not extend across substantially the entire width of the collar front wall but is disposed so as to be laterally offset to the position of the filler piece. It may preferably be provided that a dedicated clearance is provided for each cigarette group in the pack.

It may furthermore be provided that punch cuts which each define one tab are provided in the walls of the filler piece, wherein the tabs are folded in a manner transverse to the respective wall so as to increase the stability of the filler piece in this way, in particular in such a manner that the tabs are folded into the filler piece.

A further particularity may lie in that the filler piece extends across substantially the entire width of the box rear wall and on either side is supported on the opposite box side walls. The filler piece may be fixed in this way.

It is preferably provided that the filler piece extends across substantially the entire depth of the box part and on either side is supported on the box front wall and/or the collar front wall, on the one hand, and on the box rear wall, on the other hand. Fixing of the filler piece is effected also on account thereof.

A further particularity may lie in that the filler piece has a three-dimensional filler body which is formed by folding walls of a blank of packaging material, wherein the filler body is disposed between the two cigarette groups, equalizing the at least one deviating dimension.

Preferably, the filler body is configured as a hollow body and has at least four upright longitudinal edges, wherein the filler body in the cross section is preferably configured so as to be rectangular or trapezoidal.

According to one preferred design embodiment it is provided that one folding flap of the filler piece is configured on either side of the filler body, said folding flaps extending along the box rear wall, and that at least one wall of the blank is folded into the plane of the folding flaps so as to at least partially form a filler piece in the region of the wall, said filler piece continuing across substantially the entire width of the box rear wall.

It may be furthermore provided that the filler body has sidewalls which, emanating from the box rear wall, extend in the direction of the box front wall, wherein the sidewalls do not extend across the entire height of the box part in such a manner that an upper end of the cigarettes of at least one cigarette group does not bear on any side wall.

A further particularity may lie in that the filler piece, in particular in the region of a box rear wall, is connected to the box part, preferably by means of glue, wherein the glue is preferably disposed in the region of an opening of the inner wrapper.

BRIEF DESCRIPTION OF THE DRAWINGS

Preferred exemplary embodiments of the invention will be described hereunder by means of the drawing in which:

FIG. 2 shows a horizontal section through the pack according to FIG. 1, along the section plane II-II;

FIGS. 3 to 5 show three variants of the pack according to FIGS. 1 and 2;

FIG. 10 shows a vertical section through the apparatus, along the section line X-X in FIG. 6;

FIG. 11 shows a vertical section through the apparatus, along the section line XI-XI in FIG. 10;

FIG. 15 shows a side view of the apparatus in the region XV in FIG. 6;

FIG. 16 shows a side view of part of the apparatus, in the viewing direction corresponding to the arrow XVI in FIG. 15;

FIG. 23 shows a further filler piece in a three-dimensional illustration;

FIG. 24 shows a further variant of a filler piece, in a three-dimensional illustration;

FIG. 25 shows a further variant of a pack, having a filler piece corresponding to FIG. 23;

FIG. 26 shows a horizontal section through the pack, corresponding to the section line XXVI-XXVI in FIG. 25;

FIG. 27 shows a further filler piece in a three-dimensional illustration;

FIG. 28 shows a further variant of a filler piece, in a three-dimensional illustration;

FIG. 29 shows a further variant of a pack, having a filler piece corresponding to FIG. 27;

FIG. 30 shows a horizontal section through the pack, corresponding to the section line XXX-XXX in FIG. 29;

DETAILED DESCRIPTION OF PREFERRED EMBODIMENTS

Figure 1:
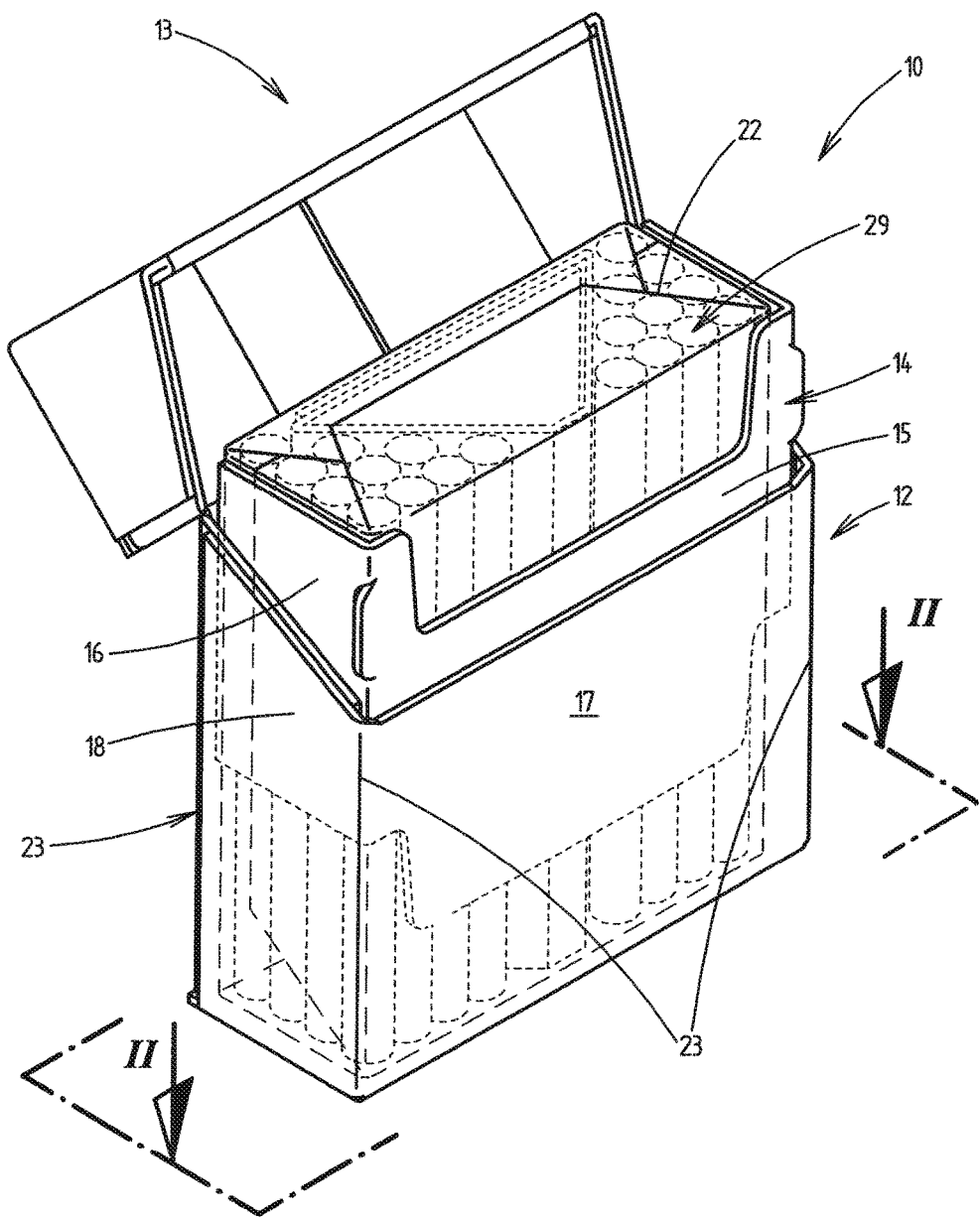
FIG. 1 shows a pack for cigarettes, having an opened lid, in a three-dimensional illustration.

The invention will be explained hereunder by means of an apparatus for producing packs 10 for cigarettes 11. It is to be understood that the packs 10 may of course also be destined for receiving pack contents other than cigarettes 11.

The invention will be described in an exemplary manner by means of a pack 10 of the hinge-lid type. The fundamental construction of packs of this type is known in the prior art so that only the substantial or particular elements, respectively, will be mentioned hereunder.

The pack 10 of the hinge-lid type is composed of a box part 12 and of a lid 13. The lid 13 is pivotably fastened to the box part 12, specifically in the region of an integral hinge on the rear side. The box part 12 and the lid 13 are produced in a known manner by folding a common blank.

In the present case, a collar 14 that protrudes from the upwardly opened box part 12 is disposed in the box part 12. The collar 14 disposes of a collar front wall 15 and respective collar sidewalls 16 that are adjacent to the former and on the internal side, specifically in the region of the box front wall 17 and of the two box sidewall s18, bear on respective walls of the box part 12. As usual, the box sidewalls 18 are formed by mutually congruent folding flaps that are interconnected by adhesive bonding.

A pack content, in the present case specifically one or a plurality of groups 19 of cigarettes 11, is furthermore disposed in the box part 12. A particularity lies in that the cigarette group 19, or the cigarette groups 19, respectively, does or do not conjointly, respectively, fill the cross section or the interior space, respectively, of the box part 12 or of the pack 10, respectively.

The cigarettes 11 in the present exemplary embodiment have a diameter of such type that part of the interior space of the pack 10, or of the cross section of the box part 12, respectively, is not filled. In other words, the dimensions of the or of all cigarette groups 19, respectively, do not correspond to the respective dimensions of the interior space of the box part 12. Alternatively or additionally, instead of the diameter of the cigarettes 11, the number of cigarettes 11 may of course be chosen such that a cavity that would not be filled by the or each cigarette group 19 would be formed in the interior space of the pack 10.

In order for the dissimilar dimensions of the interior space of the pack 10 and of the or each cigarette group 19 to be equalized, an additional element is disposed in the pack 10. This element hereunder is referred to as the filler piece 20. The latter serves for equalizing the deviating dimensions such that the pack content (cigarette group(s) and filler piece(s)) fill the pack 10 as usual.

The filler piece 20 in the exemplary embodiments shown is formed from a packaging material, for example by correspondingly folding a blank of packaging material, so as to form a three-dimensional body. The filler piece 20 is preferably configured as a hollow body or sleeve, respectively. However, it is also conceivable for filler pieces 20 to be formed from more or less solid bodies, for example from materials with low density that do not significantly increase the weight of the pack 10.

An independent particularity lies in that in the case of the pack 10 the filler piece 20 is wrapped in an inner wrapper 22 conjointly with the or each cigarette group 10.

A further particularity of the exemplary embodiment according to FIGS. 1 and 2, showing a hinge-lid pack 10 having rectangular pack edges 23, lies in that two cigarette groups 19 are disposed in the pack 10, said cigarette groups 19 being mutually separated by a filler piece 20.

In the present case the two cigarette groups 19 are of identical size, or have the same number of cigarettes 11, respectively. It is to be understood that the cigarette groups 19 of course may also contain a dissimilar size or a dissimilar number of cigarettes 11, respectively. It is furthermore to be understood that more or fewer than two cigarette groups 19 may also be provided. Accordingly, the pack 10 according to the invention is also not limited to there being only one filler piece 20; rather, a plurality of filler pieces 20 may also be disposed in the pack 10.

The number of filler pieces 20 may be fewer than the number of cigarette groups 19. Alternatively, the number of filler pieces 20 may of course also be identical to the number of cigarette groups 19. A further alternative may lie in that a larger number of filler pieces 20 than there are cigarette groups 19 is provided in the pack 10.

In the exemplary embodiment shown in FIGS. 1 and 2, the two cigarette groups 19 each are disposed in a corner region of the pack 10, specifically in an approximately triangular region between the box sidewalls 18 and the box front wall 17.

The cigarettes 11 are disposed in a plurality of parallel rows 24 and are mutually disposed in a normal position, wherein, proceeding from the box front wall 17, the number of cigarettes 11 in each of the rows 24 decreases in the direction of the box rear wall 21. A 4-3-2-1 formation is provided in the present case.

The filler piece 20 is disposed centrally between the two cigarette groups 19, so as to correspond to the formation and the arrangement of the two cigarette groups 19.

The filler piece 20 in the present case is configured as a sleeve which stands upright in the pack 10 or in the box part 12, respectively.

The shape of the filler piece 20 in the cross section approximately corresponds to a trapezoid. Accordingly, the filler piece 20 has four walls, specifically two walls 25, 26, each extending along the box front wall 17 or the box rear wall 21, respectively, and two obliquely oriented walls 27, 28 that run between the former.

A particularity of the wall 26 in the region of the box rear wall 21 lies in that the former is formed by two overlapping folding flaps which preferably overlap and are interconnected in a fully planar or substantially planar manner, respectively, across the entire face of the wall 26. In this way, the stability of the box rear wall 21, or of the rear wall of the pack 10, respectively, may be increased.

As has already been discussed, the two cigarette groups 19 and the filler piece 20 are conjointly wrapped in a common inner wrapper 22, so as to form a cigarette block 29.

The cigarette block 29 that is formed in this way in the usual manner fills the cross section of the box part 12, or the interior space of the pack 10, respectively. The two cigarette groups 19 each bear directly on the filler piece 20, wherein the filler piece 20 extends across the full height of the cigarette group 19. It is to be understood that the filler piece 20 may also have a lesser height.

A second exemplary embodiment of a pack according to the invention is shown in FIG. 3. Here too, two cigarette groups 19, each having ten cigarettes 11 and a filler piece 20, are provided.

In this case too, the filler piece 20 is disposed centrally in the pack 10, or in the box part 12, respectively, separating the two cigarette groups 19.

A first point of difference in relation to the exemplary embodiment according to FIG. 2 lies in that the pack 10 is a pack 10 having rounded pack edges 23.

Furthermore, the formation of the cigarette groups 19 corresponds to a 3-2-2-3 formation.

The filler piece 19 in the cross section is configured so as to be hexagonal, wherein two walls 25, 26 of approximately identical size are opposite one another, extending along the box front wall 17 or the box rear wall 21, respectively. The former are interconnected by four obliquely oriented walls 27, 28, 30, 31.

In this case too, the cigarettes 11 are disposed in adjacent rows 24 in a normal position, and the wall 26 in the region of the box rear wall 21 is configured having a double layer.

The third exemplary embodiment according to FIG. 4 differs from the two preceding exemplary embodiments in that the pack 10 is a pack 10 having obliquely running pack edges 23 (octagonal pack).

The filler piece 20 in the cross section has the shape of a regular hexagon, separating two cigarette groups 19 each having twelve cigarettes into five rows 24, wherein the cigarettes 11 of adjacent rows 24 each are mutually disposed in a saddle position.

A fourth exemplary embodiment of a pack 10 is shown in FIG. 5. Herein, a filler piece 20 is laterally disposed in the box part 12, a single cigarette group 19 filling the remainder of the interior space of the box part 12.

The filler piece 20 in the cross section is configured so as to be pentagonal, having five walls 25, 26, 27, 28, 30. The wall 30 in the region of a box sidewall 18 is configured having a double layer.

The cigarette group 19 is composed of five rows 24 of cigarettes 11 in a 5-4-4-4-5 formation in a saddle position.

It is understood that the packs 10 described so far of course only represent examples, and that modifications as have in part already been mentioned are possible. In particular, the shape of the filler pieces 20 is not limited to the shapes described, but arbitrary geometric shapes may be considered, so as to correspond to the desired formation of the or each cigarette group 19. Non-symmetrical shapes are also conceivable, in particular.

The production of packs 10 of this type will be described hereunder by way of the example of the pack 10 shown in FIGS. 1 and 2. The apparatus, having minor modifications, is however also suitable for producing packs 10 according to FIGS. 3 to 5, or further variants.

The central element of the apparatus is a conveyor 32 on which the or each cigarette group 19 is converged with the or each filler piece 20 so as to form an arrangement according to the pack.

In the present case, the conveyor 32 is configured in the manner of a pocket-chain conveyor, disposing of a plurality of pockets 33 which are disposed on the circumference of the conveyor 32. The pockets 33 are disposed at a constant mutual spacing, and by way of the longitudinal extent thereof are aligned so as to be transverse to the transport direction of the conveyor 32. It goes without saying that the pockets 33 may also be disposed on any other suitable conveyor, for example on a turret or similar.

So as to correspond to the pack 10 to be produced, according to FIGS. 1 and 2, each pocket 33 has a plurality of receptacles 34, 35, 36, each for one filler piece 20 or one cigarette group 19.

The receptacles 34, 35, 36 are mutually separated by walls 37, 38. Furthermore, the receptacles 34, 35, 36 are externally delimited by walls 39, 40, 41, 42 of the pocket 33.

The receptacles 34, 35, 36 in the cross section each are adapted to the cross section of the cigarette group 19, or of the filler piece 20, respectively. Accordingly, the receptacles 34 and 36, for the cigarette groups 19, in the cross section are configured so as to be approximately triangular, whereas the receptacle 35 for the filler piece 20 in the cross section is configured so as to be substantially trapezoidal.

It is provided in the present case that the filler pieces 20 are initially pushed into the receptacles 35, before the cigarette groups 19 thereafter, in a second step, are pushed into the receptacles 34 and 36.

Infeeding of the filler pieces 20 to the conveyor 32 is performed with the aid of a further conveyor 43 which in the present case is configured as a transfer turret.

Figure 7:
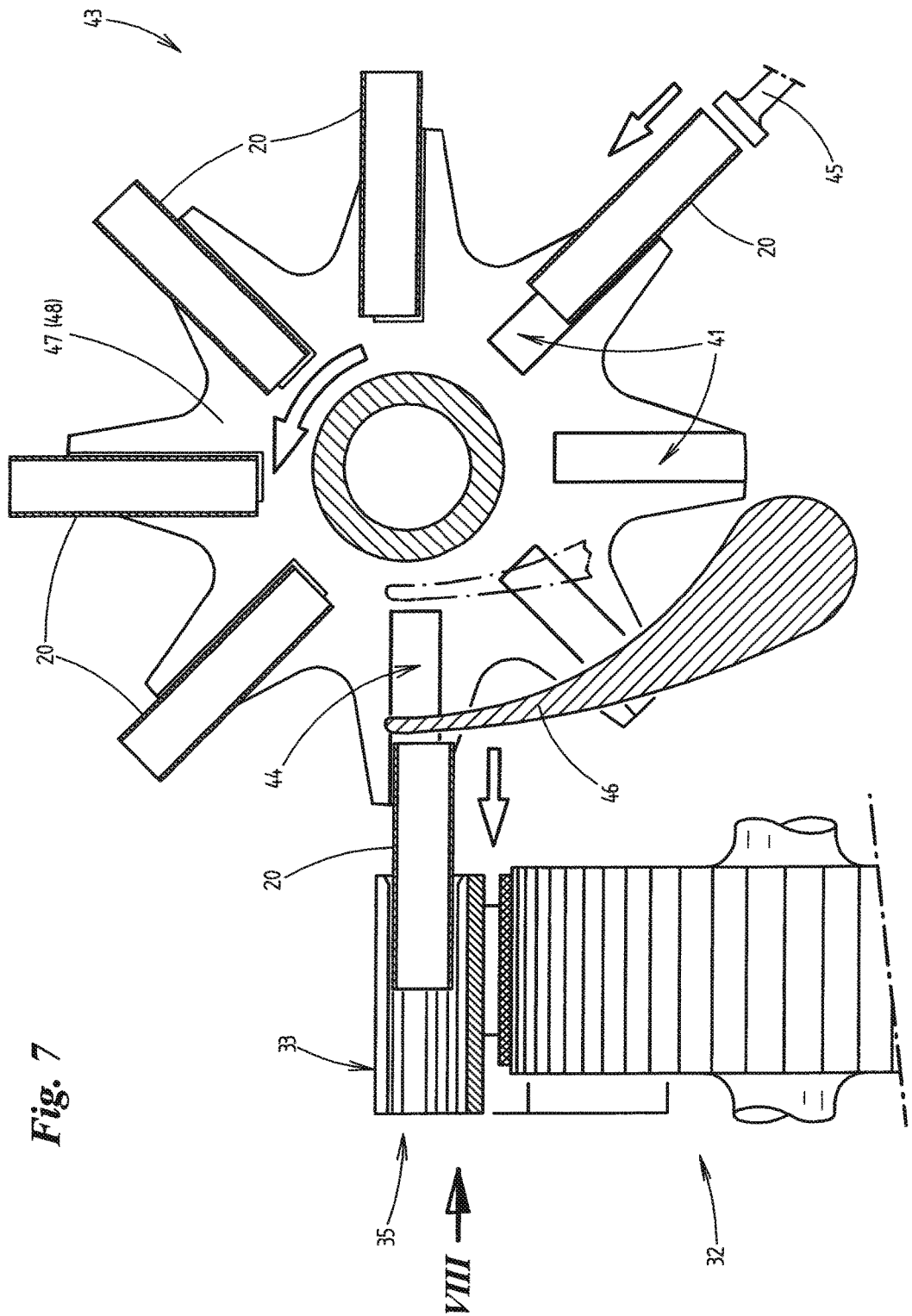
FIG. 7 shows a vertical section through the apparatus, along the section line VII-VII in FIG. 6.
Figure 8:
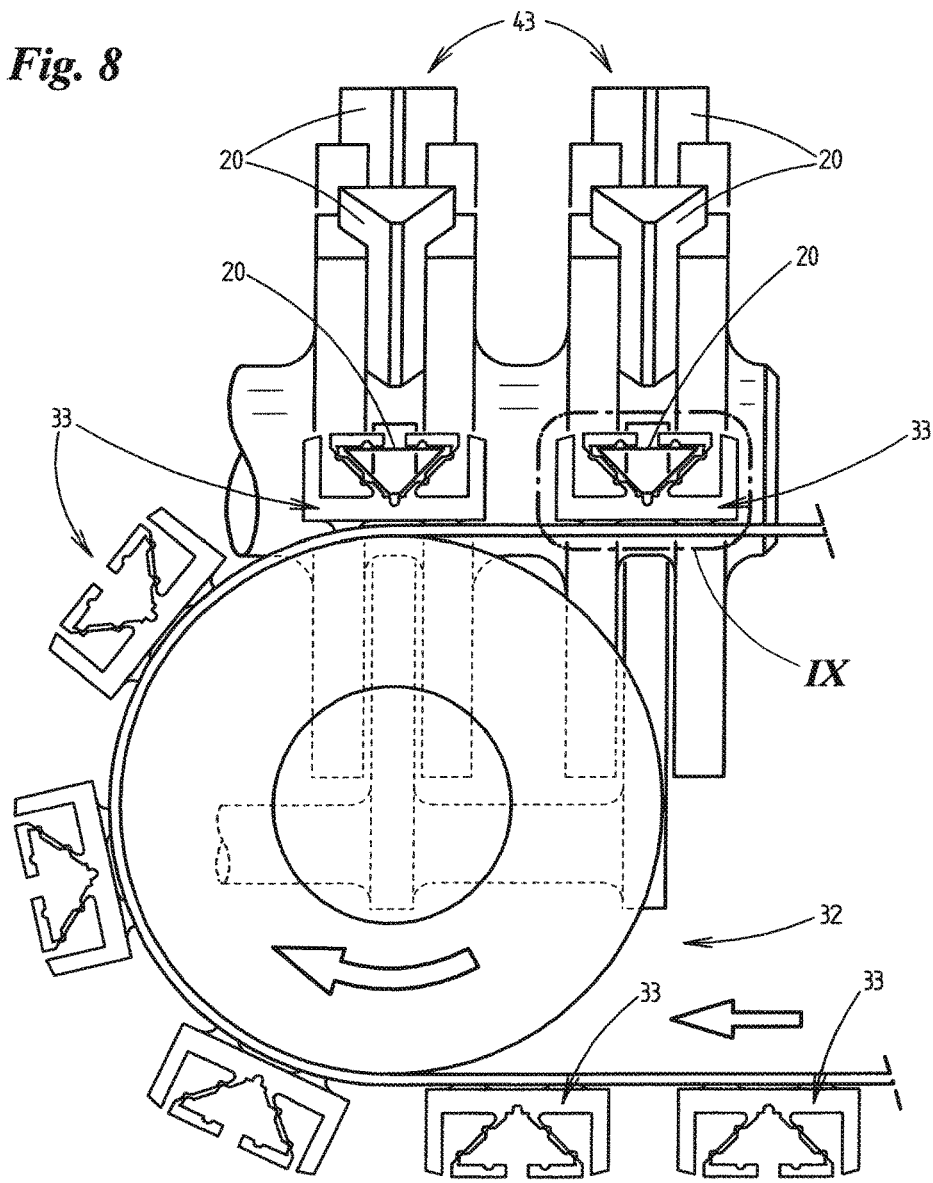
FIG. 8 shows a side view of the apparatus, in the viewing direction corresponding to the arrow VIII in FIG. 7.
Figure 9:
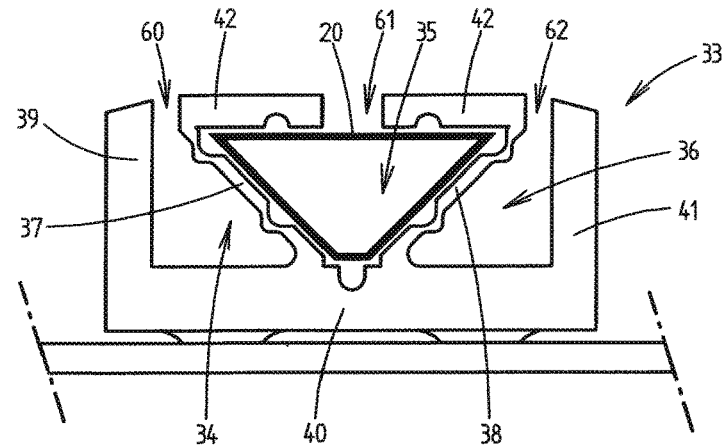
FIG. 9 shows a detail of the apparatus in the region IX in FIG. 8, in a partially enlarged illustration.

The conveyor 43 disposes of pockets 44 which are disposed so as to be distributed on the circumference of the transfer turret and which may be radially pushed into the completely folded filler pieces 20, a slide 45 serving for this purpose. After a partial revolution of the filler pieces 20 on the conveyor 43, the filler pieces 20 by means of a further slide 46 are sequentially ejected radially out of the conveyor 43 and pushed into an adjacent pocket 33 of the conveyor 43 (FIG. 7).

The transfer turret in the present case is formed by spaced-apart turret disks 47, 48, the slide 46 being disposed therebetween. Moreover, two transfer turrets 43 are disposed beside one another such that two filler pieces 20 may be simultaneously pushed into two adjacent pockets 33. Infeeding of the filler pieces 20 to the pockets 33 of the conveyor 32 thus is performed in an operating mode with multiple tracks.

In the next step, the cigarette groups 19 are infed to the pockets 33 or the receptacles 34, 36 thereof, respectively.

Cigarettes 11 are stored in a cigarette magazine 49, and in the region of a lower side of the cigarette magazine 49 are ejected from the magazine 49 as a cigarette group 19 and pushed into an adjacent pocket 33 of the conveyor 32 by a cigarette tappet 50. The ejected cigarette groups 19 are disposed in a formation according to FIG. 2.

In terms of the cigarette groups 19 being pushed in, it may be provided that the cigarette tappet 50 pushes two cigarette groups 19 simultaneously into the two receptacles 34, 36 of a pocket 33. However, this may also be performed by two separate cigarette tappets 50.

Infeeding of the cigarette groups 19 to the pockets 33 is preferably also performed in an operating mode with multiple tracks. In the exemplary embodiment shown, two cigarette groups 19 are in each case simultaneously pushed into two adjacent pockets 33.

Once the pockets 33 in the region of the conveyor 32 have been filled with cigarette groups 19 and filler pieces 20, the latter two are transferred to a downstream conveyor 51.

The transfer is performed by means of a slide 52 that pushes the content of a pocket 33, that is to say in the present case two cigarette groups 19 and a filler piece 20, conjointly in one operating step into a correspondingly positioned pocket 53 of the adjacent conveyor 51. In the present case, the conveyor 51 is configured as a transfer turret having a plurality of pockets 53 which are disposed on the circumference. It goes without saying that other solutions are possible here, too.

A particularity of the slide 52 lies in that the latter is formed from a plurality of slide elements 54, 55, 56, each being assigned to one receptacle 34, 35, 36 of the pocket 33. Outside the pocket 33, the slide elements 54, 55, 56 are connected by way of connection elements 57, 58, 59 to form one conjointly movable unit (slide 52).

A first particularity lies in that walls of the pocket 33 have slot-type clearances 60, 61, 62, the connection elements 57, 58, 59 extending therethrough. Accordingly, the clearances 60, 61, 62 extend in a continuous manner across the entire length of the pocket 33.

The width of the clearances 60, 62 in the region of the receptacles 34, 36 is dimensioned such that said width is smaller than the diameter of the cigarettes 11 that are located in the receptacles 34, 36. In this way, it may be prevented that cigarettes 11 may make their way out of the pocket 33 through the clearances 60, 62 (FIG. 11).

The clearances 60, 61, 62 each are configured in the region of an upper side of the pockets 33, specifically in the region of the wall 42.

A further particularity relates to measures that are intended to guarantee reliable ejection of the filler piece 20. The filler piece 20, configured as a sleeve, is disposed in the longitudinal extent in the receptacle 35, that is to say in such a manner that said filler piece 20 in the region of the end sides thereof may be acquired by the slide 52, or by the central slide element 55, respectively. However, since the sleeve in the region of the end side is chiefly open, only the comparatively thin periphery of the jacket of the sleeve is available as a contact face for the slide 55. There is thus the risk of the filler piece 19 not being able to be acquired in an orderly manner by the slide 52.

In order for this issue to be solved, the slide 52 protrudes laterally beyond the external contour of the filler piece 20, that is to say transversely to the ejection direction.

In the present case, this specifically is solved such that the slide 52, or the slide element 55, respectively, has cam-type portions 63 by way of which the slide 52, or the slide element 55, respectively, laterally projects beyond the contour of the filler piece 20.

So as to correspond to the arrangement of the portions 63, corresponding depressions 64 into which the portions 63 enter are molded in the walls 37, 38, 40, 42. Accordingly, the depressions 64 are configured as continuous groove-type notches on the internal side on the mentioned walls.

Figure 12:
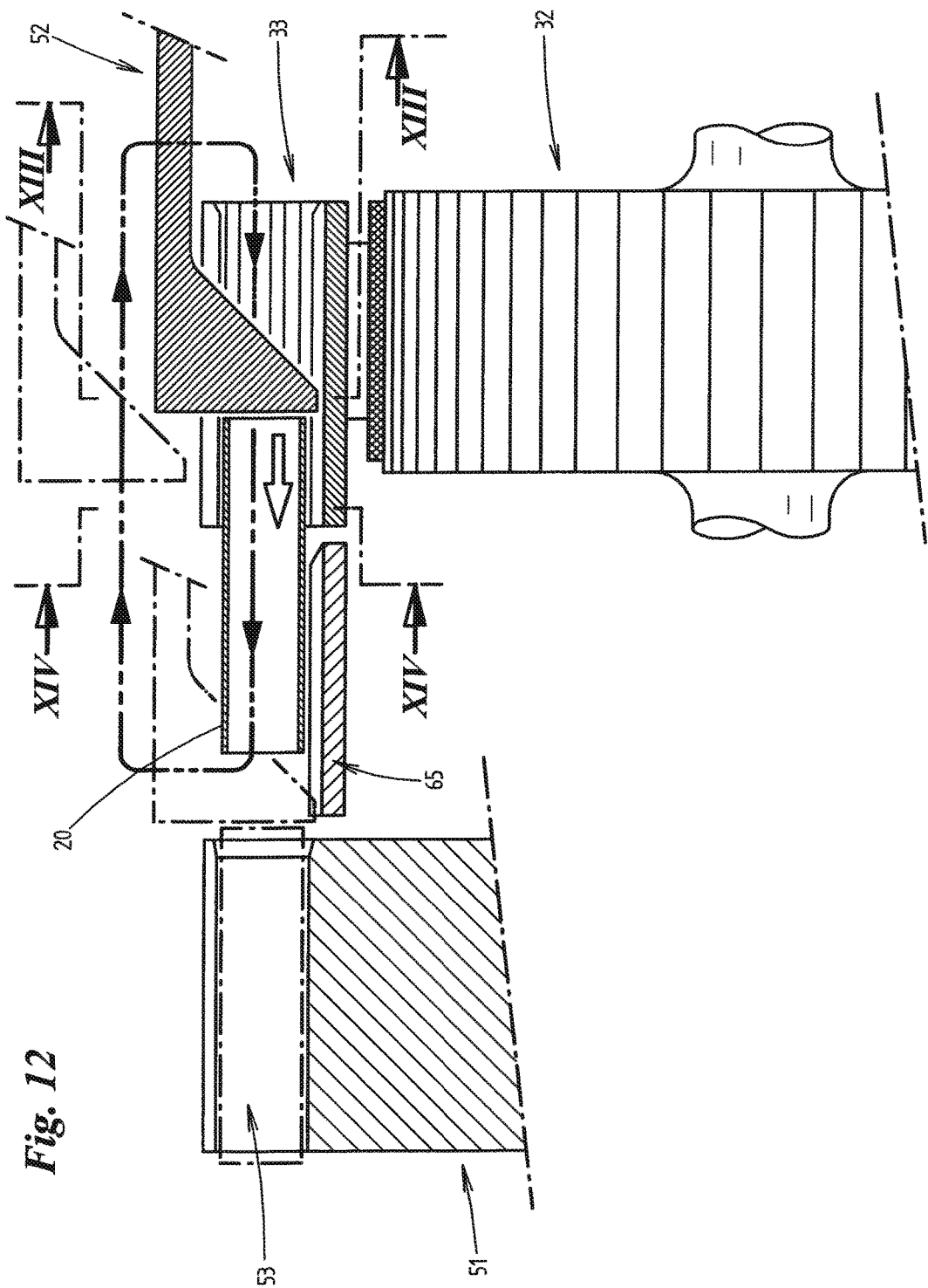
FIG. 12 shows a vertical section through the apparatus, along the section line XII-XII in FIG. 6.
Figure 13:
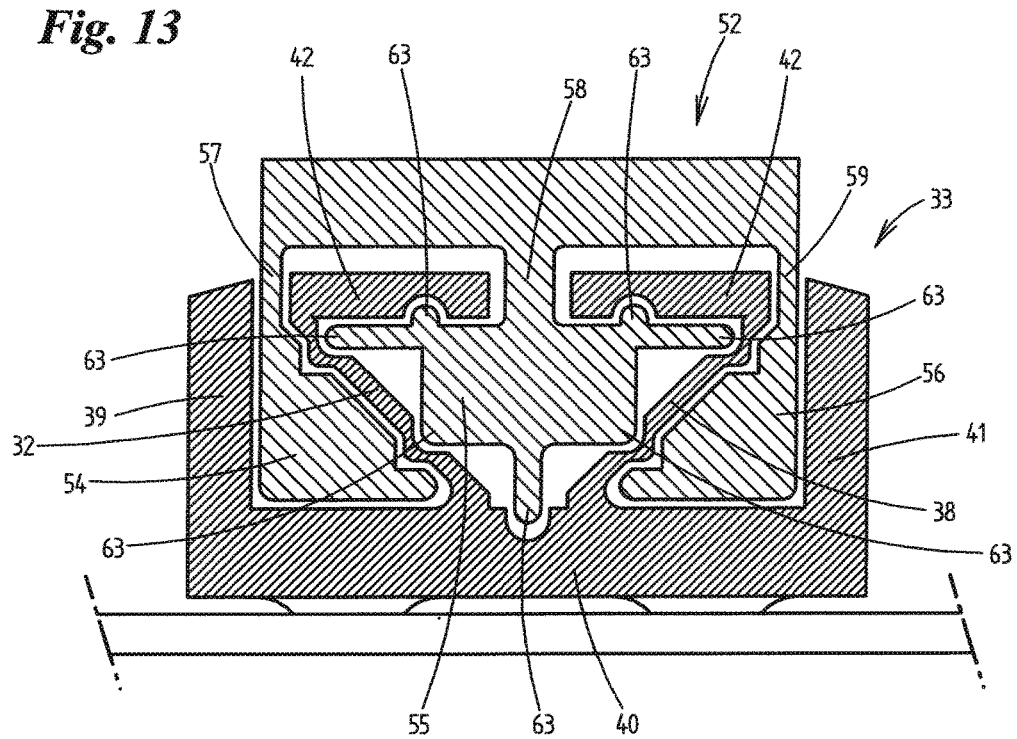
FIG. 13 shows a vertical section through the apparatus, along the section line XIII-XIII in FIG. 12.
Figure 14:
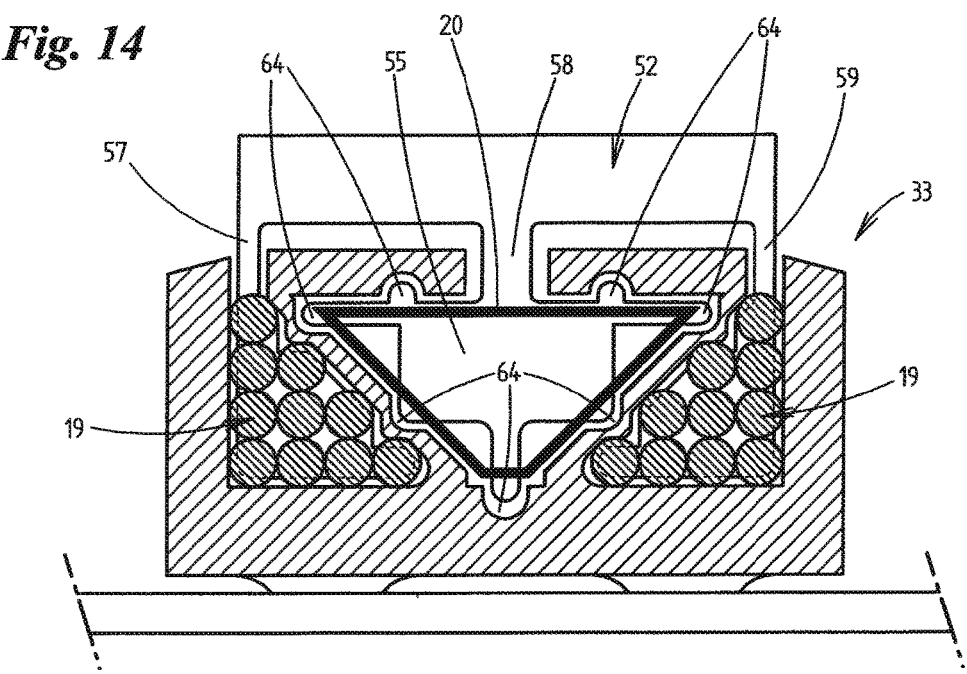
FIG. 14 shows a vertical section through the apparatus, along the section line XIV-XIV in FIG. 12.

The movement path of the slide 52 is shown in FIG. 12. Accordingly, the slide 52, after pushing in a pack content into a pocket 53 of the conveyor 51, is initially moved upward and thereafter retracted, and by way of a downward movement is moved into the initial position.

The spacing between the ejection-side end of the pocket 33 and the pocket 53 is bridged by a guide 65 which may also be configured in the form of a mouthpiece.

Figure 6:
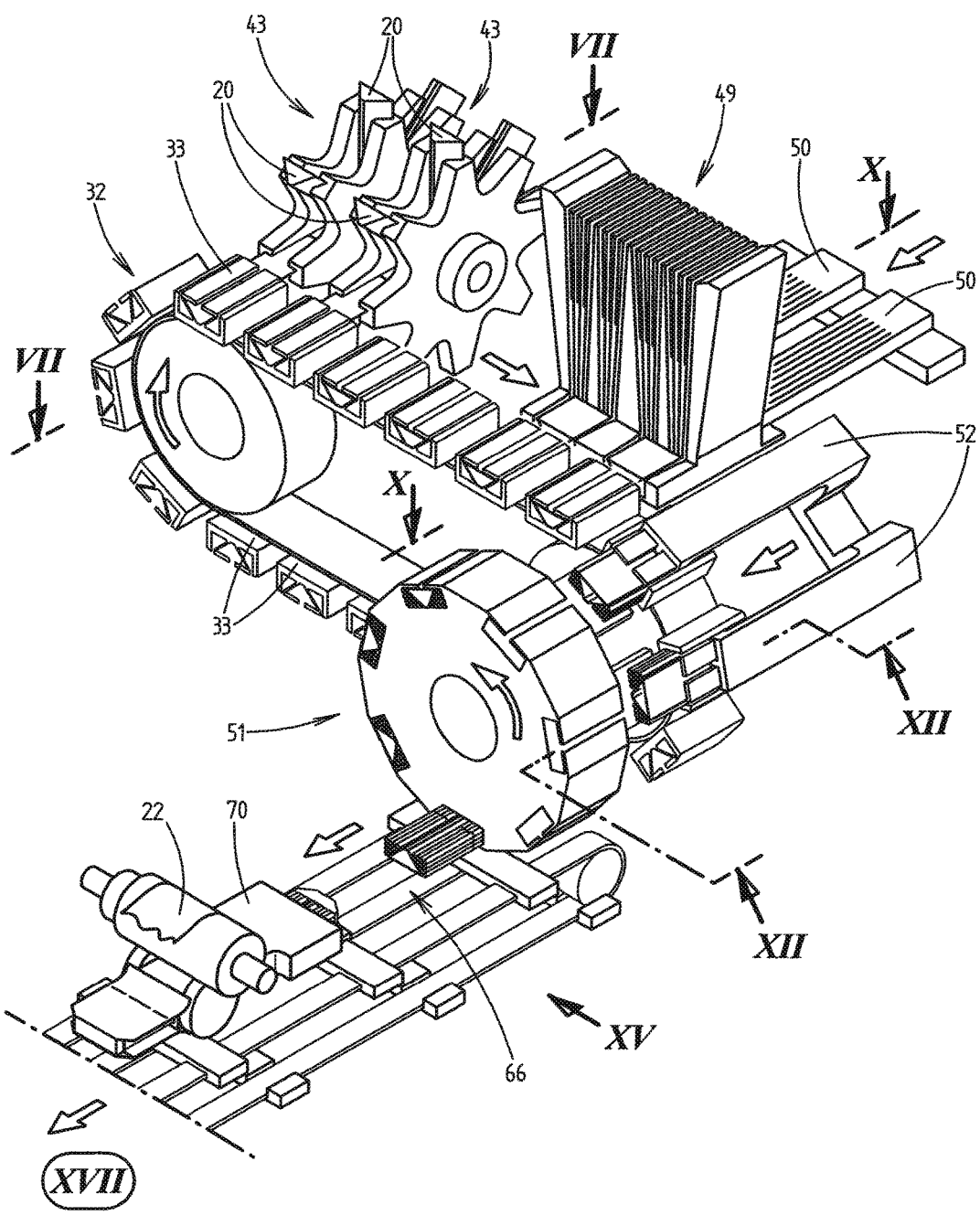
FIG. 6 shows a portion of an apparatus for producing packs of the type shown, in a schematic three-dimensional illustration.

As is shown in FIG. 6, the transfer of the pack contents from the conveyor 32 to the conveyor 51 is also performed in an operating mode with multiple tracks, by means of (two) interconnected slides 52. A single-track operating mode is also conceivable, of course.

The pack contents are transferred from the conveyor 51 to a cigarette track 66. This is performed by means of a further conveyor 67 on which entrainment elements 68 are externally disposed in a revolving manner. The entrainment elements 68 dispose of slide plates that plunge into the pockets 53 of the conveyor 51, in each case ejecting a pack content and conveying the latter along the cigarette track 66 (FIGS. 15 and 16).

A further particularity relates to the orientation of the cigarette groups 19 and of the filler pieces 20 during transportation. The latter two are infed to the conveyor 32 in a longitudinal-axial manner, that is to say with the longitudinal extent thereof pointing parallel with the conveying direction. The transfer from the conveyor 32 to the downstream conveyor 51 is also performed in a corresponding manner. The same applies to the transfer from the conveyor 51 to the cigarette track 66. It is to be understood that this type of shunting does not mandatorily have to be implemented throughout, but that only a few or an individual transfer step may be performed in this way.

During further transportation along the cigarette track 66 the pack content is held in the formation by way of guides (not shown) until said pack content is introduced into a mouthpiece 70. Subsequent to the mouthpiece 70, the pack content composed of two cigarette groups 19 and a filler piece 20 is wrapped in the inner wrapper 22, the cigarette block 29 being thus formed. This is performed in a way known in the prior art.

Subsequently, collars 71 may be infed by a transversely directed collar track 72. The collars 71 may be severed from a continuous material web 73 with the aid of cutting rollers 74.

The cigarette block 29 and the collar 71 are positioned on top of one another in the region of a platform 75, and with the aid of an insertion slide 76 are pushed into a pocket 77 of a downstream folding turret 78, or into a partially folded blank 79 for the pack 10 that is located in said pocket 77, respectively.

Figure 17:
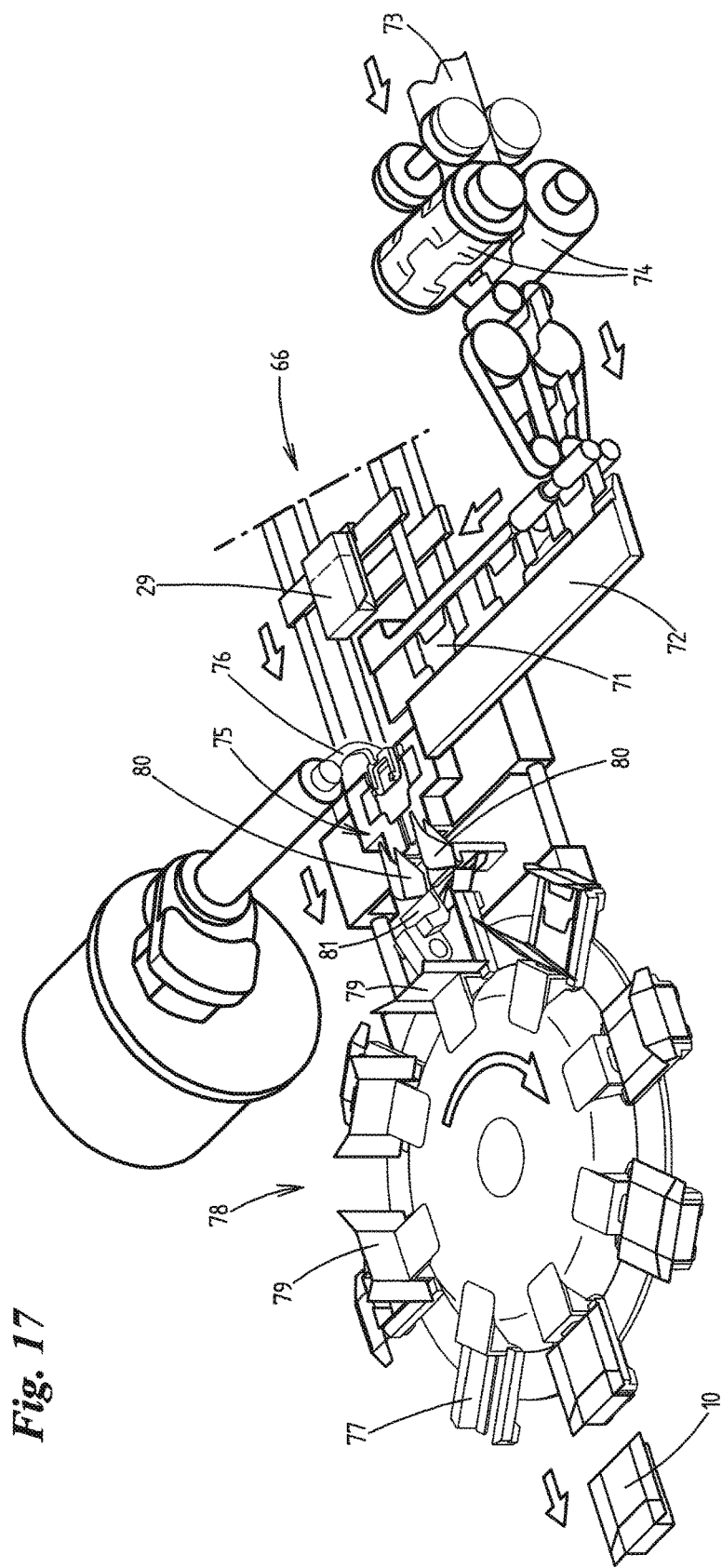
FIG. 17 shows a further portion of an apparatus for producing packs of the type shown, in a schematic three-dimensional illustration in continuation of FIG. 6.

FIG. 17 furthermore shows folding turnouts 80 for the collar 71, and a member 81 for pressing the collar 71 and the cigarette block 29 into the pocket 77.

During the further revolution on the folding turret 78, the pack 10 or the blank 79, respectively, is completed by folding, and the pack 10 that in terms of the substantial parts has been completed is ejected. FIG. 17 shows that only folding flaps in the region of narrow sidewalls of the pack 10 have not yet been interconnected. This may be performed subsequently to the folding turret 78.

Figure 18:
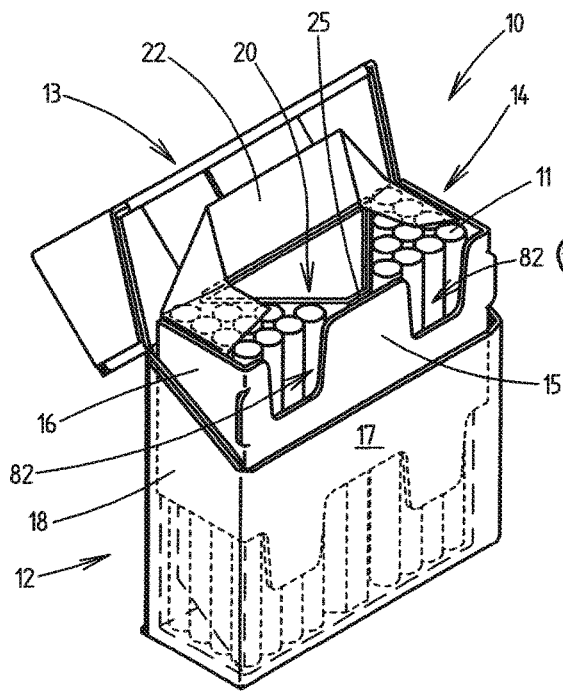
FIGS. 18 to 21 show four further variants of the pack according to FIGS. 1 and 2.
Figure 19:
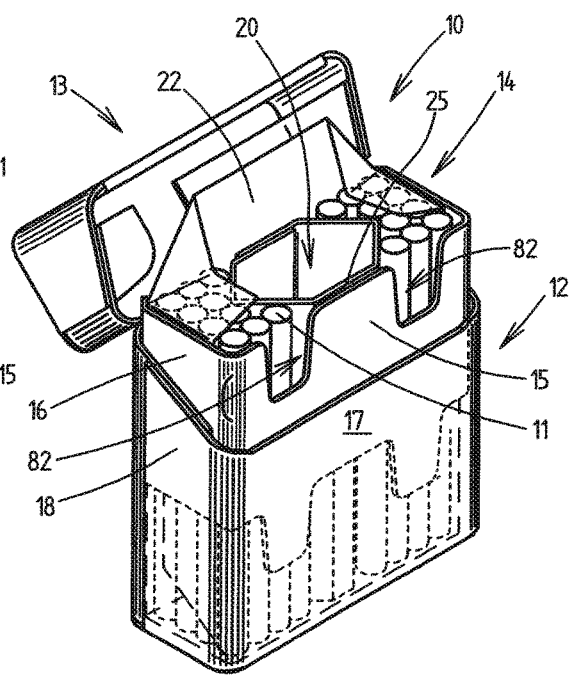
Figure 20:
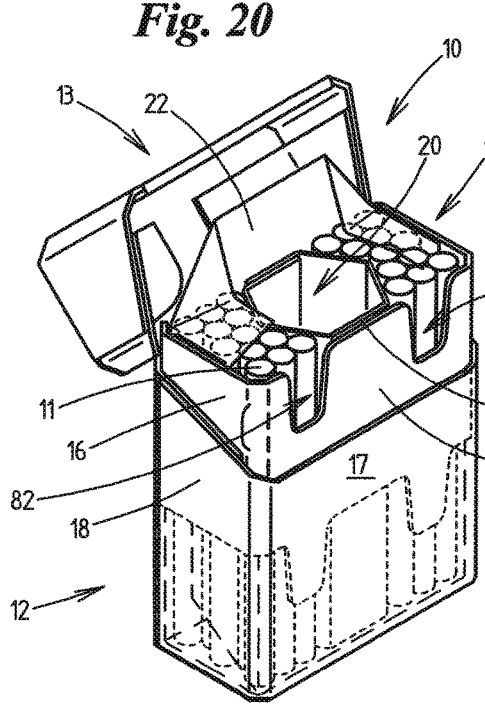
Figure 21:
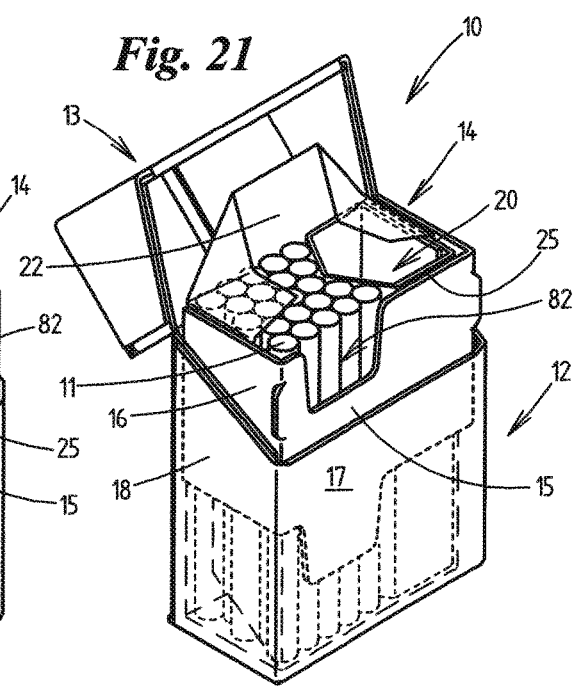

FIGS. 18 to 21 show variants of the packs 10 shown in FIGS. 1 to 5. Herein, the pack 10 shown in FIG. 18 represents a variant of the pack 10 shown in FIGS. 1 and 2. FIG. 19 shows a variant of the pack 10 shown in FIG. 3. FIG. 20 shows a variant of the pack 10 shown in FIG. 4. FIG. 21 shows a variant of the pack 10 shown in FIG. 5.

In all four variants according to FIGS. 18 and 21, the packs 10 differ from the respective packs according to FIGS. 1 to 5 in that the filler piece 20 is at least partially obscured by the collar 14.

More specifically, that wall 25 that points toward the box front wall 17 is in each case obscured by the collar 14.

This is enabled in that, in order for the retrieval of cigarettes 11 from the pack 10 to be facilitated, the usual clearances 82 in the collar front wall 15 do not extend across substantially the entire width of the collar front wall 15, as is shown in FIG. 1, but that the clearances 82 are disposed so as to be laterally offset to the position of the filler piece 20 such that the collar front wall 15 obscures the wall 26 of the filler piece 20 outside the clearance 82.

In the case of the packs 10 according to FIGS. 18 to 20, in which the filler piece 20 is centrally disposed in the box part 12, in each case two clearances 82 are disposed on either side of the filler piece 20. In the case of the pack 10 according to FIG. 21, in which the filler piece 20 is laterally disposed in the box part 12, only one clearance 82 which is disposed so as to be laterally offset to the filler piece is provided.

The or each clearance 82 may be dimensioned such that the remainder of the collar front wall 15 corresponds exactly to the width and the height of the wall 25 of the filler piece 20. However, it is also conceivable that the width is larger than the respective dimension of the wall 25 of the filler piece 20.

Figure 22:
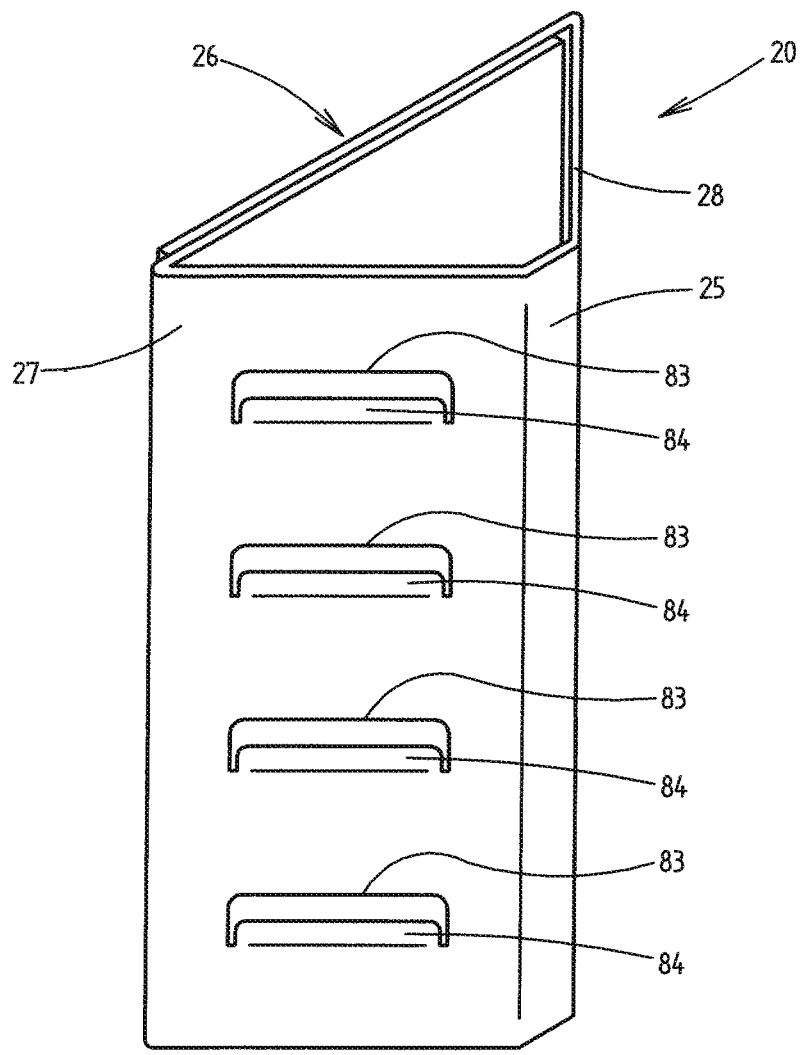
FIG. 22 shows a filler piece in a three-dimensional illustration.

FIG. 22 shows a variant of the filler piece 20 according to the pack 10 shown in FIGS. 1, 2, and 18. Herein, punch cuts 83, each defining one tab 84, are provided in one or a plurality of walls 27, 28.

A plurality of tabs 84 are in each case configured on top of one another and so as to be mutually spaced apart in the walls 27, 28.

The punch cuts 83 are configured so as to be U-shaped.

The tabs 84 that are formed by the punch cuts 83 are folded transversely to the respective wall 27, 28, so as to in this way increase the stability of the filler piece 20. The tabs 84 are preferably folded into the filler piece 20.

It is to be understood that the number and/or the dimensions and/or the positioning of the punch cuts 83, or of the tabs 84, respectively, may be chosen depending on the requirements of the respective individual case.

It is furthermore conceivable that punch cuts 83, or tabs 84, respectively, may be provided in only one wall 27, 28, or in a plurality of walls of the filler piece 20. For example, it is conceivable for punch cuts 83, or tabs 84, respectively, to be able to be provided also in the wall 26.

The solution which has been described above in the context of the filler piece 20 of the pack 10 according to FIGS. 1, 2, and 18, is capable of being applied in an analogous manner also to the other variants of the filler piece 20, in particular to the other variants shown in the application.

The packs 10 described above having the collar 14 which is adapted to the filler piece in a particular way represents an independent particularity. This also applies to the last-described variant of the filler piece 20.

A further variant of a pack 10 for cigarettes 11 is shown in FIGS. 23 to 26. As is the case in most of the previously described variants, two (or more) cigarette groups 19 are surrounded conjointly with a filler piece 20 by an inner wrapper 22. The filler piece 20 herein is disposed centrally between the two cigarette groups 19. The two cigarette groups 19 preferably have approximately the same number of cigarettes 11.

There is a particularity in terms of the filler piece 20 which extends across substantially the entire width of the cigarette block 29, or of the box rear wall 21, respectively. In this way, the filler piece 20 may be supported on either side on the opposite box sidewalls 18, on account of which the position of the filler piece 20 is fixed.

Moreover, the filler piece 20 also extends in the direction of the collar front wall 15, or of the box front wall 17, respectively, and is also supported on these walls.

The filler piece 20 is formed by correspondingly folding a blank 85. To this end, fold lines and punch cuts along which the respective walls of the blank 85 are folded are attached to the blank 85. Herein, initially two fold lines 86 which extend across the entire height of the blank 85, each delimiting one peripheral folding flap 87, are to be mentioned. The folding flaps 87 each are supported by way of a free lateral periphery on the respective box sidewall s18.

That portion of the blank 85 that lies between the two fold lines 86 serves for forming a three-dimensional filler body 88 which is disposed between the two cigarette groups 19, substantially filling the space therebetween.

The filler body 88 in the cross section in the present case is configured so as to be rectangular, having two sidewalls 89 which, emanating from the plane of the box rear wall 21, extend up to the plane of the box front wall 17, being oriented substantially perpendicularly to the latter or to the folding flaps 87, respectively. Furthermore, the filler body 88 disposes of a front wall 90 which connects the two sidewalls 89 and runs parallel to the box front wall 17.

A particularity lies in that the filler body 88 does not extend continuously across the entire height of the cigarette group 19 and/or of the box part 12, but that the walls 93 of the blank 85 in regions are folded into the plane of the folding flaps 87. To this end, the blank 85 has horizontal punch cuts 91, on the one hand, and additional fold lines 92 which enable a corresponding positioning of the walls 93.

Herein, the upper punch cut 91 is disposed so as to be approximately level with the upper edge of the collar front wall 15 in the region of the clearance 82 of the collar 14, or so as to be slightly thereabove.

As is shown in FIG. 23, the blank 85 is folded such that the walls 93 lie in the plane of the folding flaps 87, the filler piece 20 in this region thus being configured continuously across substantially the entire width of the box part 12. In this way, the filler piece 20 is reinforced in the respective direction.

In the exemplary embodiment according to FIG. 23, the walls 93 each are in an upper and a lower peripheral region of the blank 85. In the upper peripheral region, there is the added advantage that the retrieval of cigarettes 11 is simplified. By way of the folded over legs 94 of the sidewalls 89, the latter terminate level with the walls 93, so as to be spaced apart from the collar front wall 15 such that in particular the cigarettes 11 in a front corner region of the cigarette group 19, adjacent to the filler body 88, may be more readily acquired and retrieved.

The filler piece 20 shown in FIG. 24 represents a variant of the filler piece shown in FIG. 23, in which two walls 93 are provided so as to be spaced apart from the upper side and from the lower side of the filler piece 20. In the case of this solution, the advantage of easier retrieval of the cigarettes 11 is dispensed with.

A variant of the solution shown in FIGS. 23 to 26 is shown in FIGS. 27 to 30, in which the filler body 88 of the filler piece 20 has a trapezoidal cross section.

The base of the trapezoid that forms the walls 93 herein is disposed along the box rear wall 21, whereas the opposite shorter base side that forms the front wall 90 extends along the collar front wall 15 and/or the box front wall 17.

The two legs of the trapezoid that form the sidewalls 89, emanating from the box rear wall 21, extend in a converging manner in the direction of the collar front wall 15, or of the box front wall 17.

By virtue of the cross-sectional shape of the filler body 88, the legs 94 are configured so as to be significantly shorter than is the case in the variant according to FIGS. 23 to 26.

Figure 31:
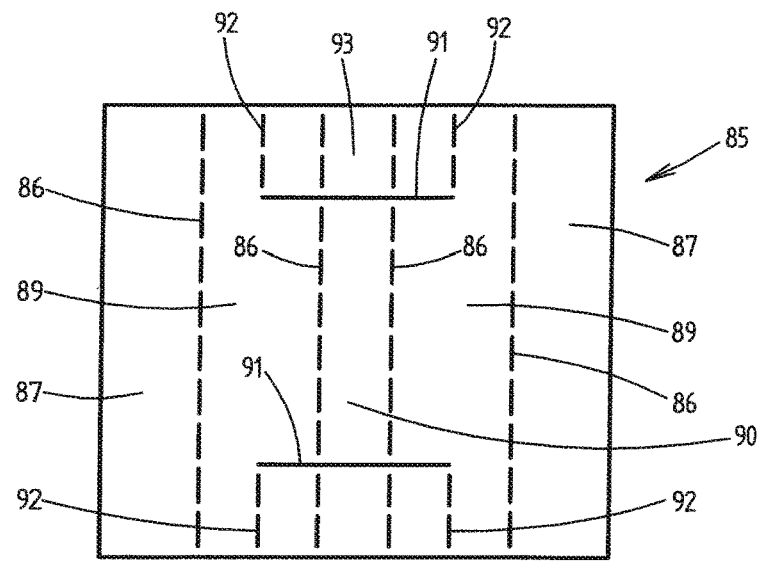
FIG. 31 shows a blank for producing a filler piece according to FIG. 23.
Figure 32:
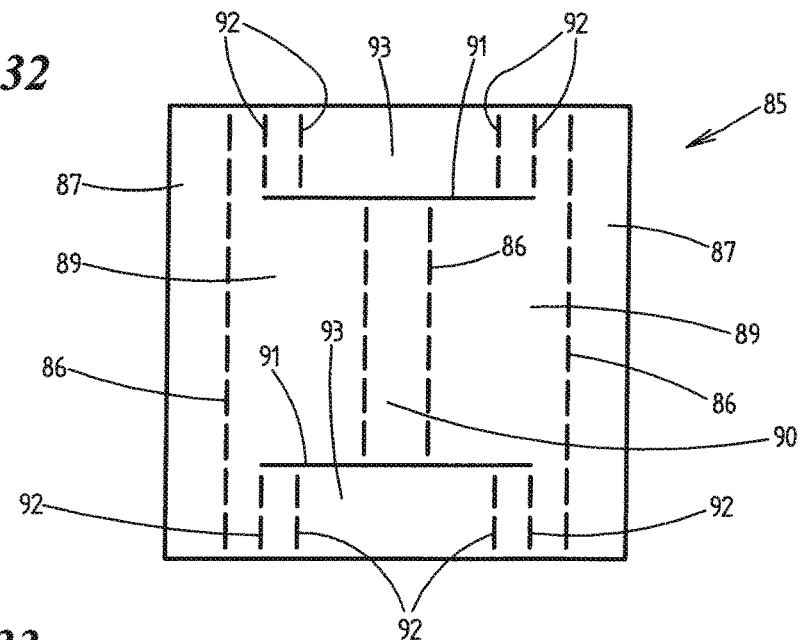
FIG. 32 shows a blank for producing a filler piece according to FIG. 27.

FIG. 32 shows a blank 85 corresponding to the illustration in FIG. 31.

Figure 33:
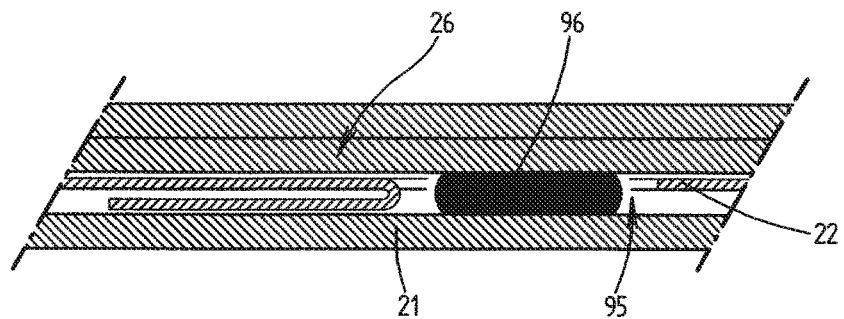
FIG. 33 shows a partial section through the pack, along the section line XXXIII-XXXIII in FIG. 2.

A further possibility for fixing the filler piece 20 is shown in FIG. 33. Accordingly, that wall 26 of the filler piece 20 that faces the box rear wall 21 is adhesively bonded to the internal side of the box rear wall 21.

To this end, an opening 95 in the material of the inner wrapper 22 is established. This may for example be performed by punching or perforating the material of the inner wrapper 22 in a corresponding or similar manner. This is preferably performed in such a way that that the material of the inner wrapper 22 in the region of the opening 95 is not completely severed but is folded over about a residual connection.

The glue 96 for fixing the filler piece 20 may either be applied to the box rear wall 21 or to the filler piece 20, and may optionally be (re)activated once the parts have been joined together.

It is also conceivable that fixing of the filler piece 20 to the pack 10 is performed in the region of other side walls, optionally also in addition to fixing in the region of the rear side.

LIST OF REFERENCE SIGNS

10 Pack
11 Cigarette
12 Box part
13 Lid
14 Collar
15 Collar front wall
16 Collar sidewall
17 Box front wall
18 Box sidewall
19 Cigarette group
20 Filler piece
21 Box rear wall
22 Inner wrapper
23 Pack edge
24 Row
25 Wall
26 Wall
27 Wall
28 Wall
29 Cigarette block
30 Wall
31 Wall
32 Conveyor
33 Pocket
34 Receptacle
35 Receptacle
36 Receptacle
37 Wall
38 Wall
39 Wall
40 Wall
41 Wall
42 Wall
43 Conveyor
44 Pocket
45 Slide
46 Slide
47 Turret disk
48 Turret disk
49 Cigarette magazine
50 Cigarette tappet
51 Conveyor
52 Slide
53 Pocket
54 Slide element
55 Slide element
56 Slide element
57 Connection element
58 Connection element
59 Connection element
60 Clearance
61 Clearance
62 Clearance
63 Portion
64 Depression
65 Guide
66 Cigarette track
67 Conveyor
68 Entrainment element
69 Slide plate
70 Mouthpiece
71 Collar
72 Collar track
73 Material web
74 Cutting roller
75 Platform
76 Insertion slide
77 Pocket
78 Folding turret
79 Blank
80 Folding turnout
81 Member
82 Clearance
83 Punch cut
84 Tab
85 Blank
86 Fold line
87 Folding flap
88 Filler body
89 Sidewall
90 Front wall
91 Punch cut
92 Fold line
93 Wall
94 Leg
95 Opening
96 Glue

The invention claimed is:

1. A pack (10) for cigarettes (11), wherein:
the pack (10) comprises a box part (12), an interior space having dimensions, and an inner wrapper (22);
at least one group of cigarettes (11) is disposable as a plurality of cigarette groups (19) in the interior space of the pack (10) as pack contents;
at least one deviating dimension of the plurality of cigarette groups (19) does not correspond to a respective dimension of the interior space of the pack (10);
the at least one deviating dimension is equalized by at least one filler piece (20) having a three-dimensional filler body (88) which is configured as a hollow body and is formed by folding walls of a blank (85) of packaging material;
the at least one filler piece (20) is wrapped in the inner wrapper (22) conjointly with the plurality of cigarette groups (19);

the filler body (88) is disposed between two of the plurality of cigarette groups (19) within the pack (10), thus equalizing the at least one deviating dimension; and the filler piece comprises walls (27, 28), and punch cuts (83) provided in the walls (27, 28) of the filler piece (20), wherein the punch cuts each define one tab (84), and wherein the one tab (84) is folded into the filler piece (20) in a manner transverse to a respective one of the walls (27, 28) so as to increase the stability of the filler piece (20) in this way.

2. The pack as claimed in claim 1, further comprising a collar (14) disposed in the pack (10), wherein the filler piece (20) is at least partially obscured by the collar in such a manner that another wall (25) of the filler piece (20) that points toward a box front wall (17) is obscured by the collar (14), and wherein for facilitating the retrieval of cigarettes (11) from the pack (10) one clearance (82) in a collar front wall (15) does not extend across substantially the entire width of the collar front wall (15) but is disposed so as to be laterally offset to the position of the filler piece (20).

3. The pack as claimed in claim 2, wherein the one clearance (82) is provided for facilitating the retrieval of cigarettes (11) from each of the plurality of cigarette groups (19) in the pack (10).

4. The pack as claimed in claim 1, wherein the filler piece (20) extends across substantially an entire width of a box rear wall (21) of the pack (10) and on either side is supported on opposite box sidewalls (18) of the pack (10).

5. The pack as claimed in claim 1, wherein the filler piece (20) extends across substantially an entire depth of the box part (12) of the pack (10) and on either side is supported on a box front wall (17) and/or a collar front wall (15), on the one hand, and on a box rear wall (21), on the other hand.

6. The pack as claimed in claim 1, wherein the filler body (88) has at least four upright longitudinal edges, and wherein the filler body (88) in the cross section is configured so as to be rectangular or trapezoidal.

7. The pack as claimed in claim 1, wherein the filler body (88) has sidewalls (89) which, emanating from a box rear wall (21), extend in the direction of a box front wall (17), and wherein the sidewalls (89) do not extend across an entire height of the box part (12) in such a manner that an upper end of the cigarettes (11) of the at least one cigarette group (19) does not bear on any of the sidewalls (89).

8. A pack (10) for cigarettes (11), wherein:
the pack (10) comprises a box part (12), an interior space having dimensions, and an inner wrapper (22);
at least one group of cigarettes (11) is disposable as a plurality of cigarette groups (19) in the interior space of the pack (10) as pack contents;
at least one deviating dimension of the plurality of cigarette groups (19) does not correspond to a respective dimension of the interior space of the pack (10);
the at least one deviating dimension is equalized by at least one filler piece (20) having a three-dimensional filler body (88) which is configured as a hollow body and is formed by folding walls of a blank (85) of packaging material;
the at least one filler piece (20) is wrapped in the inner wrapper (22) conjointly with the plurality of cigarette groups (19);
the filler body (88) is disposed between two of the plurality of cigarette groups (19) within the pack (10), thus equalizing the at least one deviating dimension;
the filler piece comprises one folding flap (87), the filler piece (20) being configured on either side of the filler body (20), the one folding flap (87) extending along a box rear wall (21); and
at least one of the folding walls (93) of the blank (85) is folded into the plane of the folding flap (87) so as to at least partially form the filler piece (20) in the region of the at least one of the folding walls (93), the filler piece (20) continuing across substantially an entire width of the box rear wall (21).

9. A pack (10) for cigarettes (11), wherein:
the pack (10) comprises a box part (12), an interior space having dimensions, and an inner wrapper (22);
at least one group of cigarettes (11) is disposable as a plurality of cigarette groups (19) in the interior space of the pack (10) as pack contents;
at least one deviating dimension of the plurality of cigarette groups (19) does not correspond to a respective dimension of the interior space of the pack (10);
the at least one deviating dimension is equalized by at least one filler piece (20) having a three-dimensional filler body (88) which is configured as a hollow body and is formed by folding walls of a blank (85) of packaging material;
the at least one filler piece (20) is wrapped in the inner wrapper (22) conjointly with the plurality of cigarette groups (19);
the filler body (88) is disposed between two of the plurality of cigarette groups (19) within the pack (10), thus equalizing the at least one deviating dimension; and
the filler piece (20) in the region of a box rear wall (21) is connected to the box part (12) by means of glue (96), wherein the glue (96) is disposed in the region of an opening (95) of the inner wrapper (22).

* * * * *